US008032841B2

(12) United States Patent
Martin et al.

(10) Patent No.: US 8,032,841 B2
(45) Date of Patent: Oct. 4, 2011

(54) EXCEPTION PAGE PROGRAMMING SYSTEM

(75) Inventors: Andrew Martin, Honeoye Falls, NY (US); Shane Jewitt, Rochester, NY (US); Ken Hayward, Brockport, NY (US)

(73) Assignee: Xerox Corporation, Norwalk, CT (US)

( * ) Notice: Subject to any disclaimer, the term of this patent is extended or adjusted under 35 U.S.C. 154(b) by 823 days.

(21) Appl. No.: 11/881,267

(22) Filed: Jul. 26, 2007

(65) Prior Publication Data

US 2009/0031235 A1 Jan. 29, 2009

(51) Int. Cl.
*G06F 3/048* (2006.01)

(52) U.S. Cl. .......................... 715/838; 715/810; 715/825

(58) Field of Classification Search .................. 715/765, 715/825, 777, 804, 811, 823, 838, 749, 760, 715/810

See application file for complete search history.

(56) References Cited

U.S. PATENT DOCUMENTS

| | | | | | |
|---|---|---|---|---|---|
| 5,133,048 | A | * | 7/1992 | Parsons et al. | 358/1.12 |
| 5,398,289 | A | * | 3/1995 | Rourke et al. | 382/100 |
| 5,614,993 | A | * | 3/1997 | Smith et al. | 399/81 |
| 6,621,590 | B1 | * | 9/2003 | Livingston | 358/1.15 |
| 6,628,311 | B1 | * | 9/2003 | Fang | 715/777 |
| 2003/0020956 | A1 | * | 1/2003 | Goel et al. | 358/1.18 |
| 2003/0043212 | A1 | * | 3/2003 | Kremer | 345/838 |
| 2003/0086719 | A1 | * | 5/2003 | Dennison et al. | 399/81 |
| 2004/0046797 | A1 | * | 3/2004 | Perry | 345/771 |
| 2004/0060010 | A1 | * | 3/2004 | Bright et al. | 715/526 |
| 2004/0194033 | A1 | * | 9/2004 | Holzwarth et al. | 715/530 |
| 2005/0041993 | A1 | * | 2/2005 | Barry et al. | 399/127 |
| 2005/0128500 | A1 | * | 6/2005 | Nakagiri | 358/1.9 |
| 2005/0157330 | A1 | * | 7/2005 | Giuliano | 358/1.15 |
| 2006/0262338 | A1 | * | 11/2006 | Momose et al. | 358/1.13 |
| 2007/0013969 | A1 | * | 1/2007 | Mori | 358/452 |
| 2007/0146732 | A1 | * | 6/2007 | Piazza et al. | 358/1.1 |
| 2007/0253020 | A1 | * | 11/2007 | Hull et al. | 358/1.15 |
| 2007/0300168 | A1 | * | 12/2007 | Bosma et al. | 715/762 |

OTHER PUBLICATIONS

U.S. Appl. No. 11/702,771, filed Feb. 6, 2007, Martin et al.

* cited by examiner

*Primary Examiner* — Weilun Lo
*Assistant Examiner* — Rashedul Hassan
(74) *Attorney, Agent, or Firm* — Fay Sharpe LLP

(57) ABSTRACT

The present disclosure relates to exception page programming, and, in particular, to a system and method for providing an exception page programming tool for use with a page description language file where the exception page programming tool can display exception page programming within the context of a print job.

16 Claims, 23 Drawing Sheets

150

| Page(s) | Sheet | Type | Setup |
|---|---|---|---|
| 1 | 1 | Multiple Exceptions | Cover; Image Quality; Image Shift; |
| | | Cover | Print on Side 1; US Letter (8.5 x 11"), White, Heavy (106-216 gsm) |
| | | Image Quality | Brightness +3 |
| | | Image Shift | Independent Shift; Left +12 |
| 2 | 1 | Cover | Print on Side 2; US Letter (8.5 x 11"), White, Heavy (106-216 gsm) |
| 3 | 2 | | |
| 4 | 2 | | |

| Page(s) | Sheet | Type | Setup |
|---|---|---|---|
| 1 | 1 | | |
| 2 | 1 | | |
| 3 | 2 | | |
| 4 | 2 | | |
FIG. 21
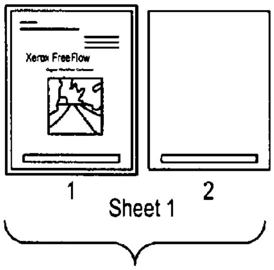
FIG. 22
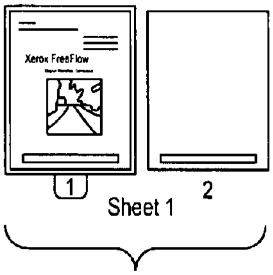
FIG. 23
| Page(s) | Sheet | Type | Setup |
|---|---|---|---|
| 1 | 1 | | |
| 2 | 1 | | |
| 3 | 2 | | |
| 4 | 2 | | |
FIG. 24

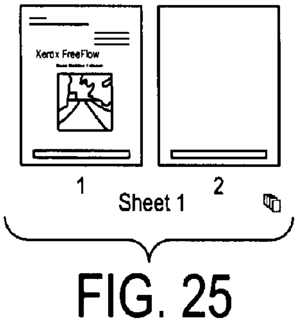
FIG. 25
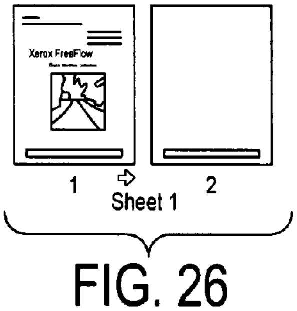
FIG. 26
| Page(s) | Sheet | Type | Setup |
|---|---|---|---|
| 1 | 1 | Cover | Print on Side 1; US Letter (8.5 x 11"), White, Heavy (106-216 gsm) |
| 2 | 1 | Cover | Print on Side 2; US Letter (8.5 x 11"), White, Heavy (106-216 gsm) |
| 3 | 2 | | |
| 4 | 2 | | |
FIG. 27
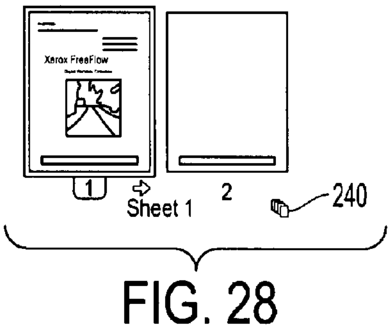
FIG. 28

EXCEPTION PAGE PROGRAMMING SYSTEM

CROSS REFERENCE TO RELATED PATENTS AND APPLICATIONS

U.S. patent application Ser. No. 11/702,771, filed Feb. 6, 2007, entitled "SYSTEM AND METHOD FOR PROVIDING CONTEXTUAL EXCEPTION PAGE PROGRAMMING WITHIN A PRINT JOB," to Martin et al., is totally incorporated herein by reference.

BACKGROUND

1. Technical Field

The present disclosure relates to exception page programming, and, in particular, to a system and method for providing an exception page programming tool for use with a page description language file where the exception page programming tool can display exception page programming within the context of a print job.

2. Description of Related Art

Page description languages ("PDLs") are computer languages and/or file formats that can be translated into printed documents. Many printing systems can accept the PDL data directly without pre-processing by another device such as a computer. PDL files are generally designed for describing how characters, graphics, and/or images should be printed on a substrate by a printing device. PDL files generally store printing data in a more abstract manner than a pixel-wise image file. For example: rather than describing a square pixel-by-pixel, a PDL file may describe the square in terms of position, size, color etc. These types of PDL files may have several advantages over bitmap files, such as file size and platform robustness. Additionally, some printing systems may receive a PDL file directly with minimal or no processing before the file is received by the printing system.

When setting up one or more PDL files for printing, specialized printing tools sometimes assist a user in controlling the settings, printing flow, and/or other parameters for setting up a printing job for a printer system. For example: it is common to apply exception level programming to a PDL file before printing commences. Generally, "exceptions" in this context, are items not included in the original page content of the PDL file or contain different item level programming from the body of the job. These are considered to be "Exceptions" to the job-level programming that defines the body of the job. Exceptions may be applied to one or more pages, and exceptions generally do not modify the PDL file itself, but rather provide an effective way to make last minute changes and/or specialized settings. Tools that apply exception level programming are called exception page programming tools.

Typically, exceptions can be set for paper stocks (covers, stock exceptions, page inserts), page sequencing (chapter starts), image quality and image shifting. Other exceptions may include subset finishing, imposition, and page level annotation. For example, a PDL file may include image quality information, such as contrast settings, color settings and other settings associated with certain aspects of the PDL file. An exception may be applied to a particular page or a subset of pages that override these PDL properties.

Though, not all exceptions override PDL parameters; for example: pages may be inserted in between pages, such as tabbed pages to delineate sections and/or chapters. These inserts are also sometimes treated as exceptions. Additionally, exception level programming may apply to the current stock (sometimes referred to as the paper stock). The stock is the type of medium or material that is to be printed on. Many modern printing systems have multiple sources of stock, separated by color, quality, weight, medium, material, finishing and/or coating material. For example, a PDL file may have 30 pages of text and one photographic quality page; an exception may be associated with that photographic quality page to utilize a medium more suitable for printing a photographic level of detail and/or quality.

In addition, some exception level programming may include "subset finishing" features, where a subset of pages, sheets, or aspects are modified. For example, a subset of pages may have certain attributes that are modified in the printing process, such as the use of high quality paper for a certain chapter of a PDL file. Also, an exception (or subset finishing) may be applied for stapling a range of pages within a print job. These changes are also considered exception level programming.

There are at least two general types of objects that exceptions select and manage: pages and sheets. Pages are usually discrete pieces of print-related data contained within the PDL file that are to be printed. Exceptions that may be applied to pages include chapter starts, image quality adjustment and image shifting. Sheets usually are pieces of paper. Each sheet has two sides, a front and back, that can be printed on. A page can be mapped to a side of a sheet. It is common practice to map pages to one or both sides of a sheet, e.g., page 1 is printed on side 1 of sheet 1, while page 2 is printed on side 2 of sheet 1, or alternatively, page 1 is printed on side 1 of sheet 1, while page 2 is printed on side 1 of sheet 2. Thus, in certain contexts, the two words may be used interchangeably.

Also, there are two general classifications of print job programming: job-level programming and page-level programming. The job level programming tools usually modify features for the entire job. Page-level programming is usually done by modifying and/or creating exceptions by utilizing an exception programming tool; although it is possible to utilize exceptions to modify multiple pages and/or sheets.

Exception programming varies according to many aspects, including but not limited to: the PDL language, the printing system used, the time constraints, expense constraints and stock availability. Also, exception page programming may be conducted by a user from several locations. A user may control the programming from a computer that is directly attached to the printing system, from a computer that may access the printer through a network, from a computer that is part of the printing system, from a digital front end and/or may be a user interface attached directly to the printing system itself.

Usually, a graphical user interface (abbreviated herein as "GUI") is utilized to assist in exception page programming. Additionally, software that creates, edits, converts PDL files may also contain integrated modules and/or software to provide exception level programming. Currently exception programming is generally viewed in terms of "exception only" views, i.e. views that only include the pages that have exceptions applied to them. There has been a need to provide a more effective way to view exceptions while doing exception page programming than viewing only the exceptions.

As with most graphical user interfaces, however, there is sometimes a trade-off between processing speed and ease-of-use. Consider the following: within other software tools and in some operating systems, it is possible to view images as icons or thumbnails. Icon viewing is where a small picture, image or graphic is used to show a generic display for an item type, e.g., an operating system may show the same image for all word-processing files of a certain file format.

Thumbnails, on the other hand, may provide a preview or a "sneak-peak" of some or all of the content found in the underlying file. For example, some operating systems, when viewing files within a certain directory (or folder) display a small picture of what the file actually looks like when opened. For example, if a user has a jpeg file of a picture taken of a fish during a fishing expedition, the file may show a smaller image of that picture (and thus a small "thumbnail" of the fish in question).

Thumbnails are not necessarily limited to image and picture files. Certain types of files may be "rendered" and/or interpreted. For example, consider a word-processing file: a thumbnail image may be an image of the file (or a particular page) when opened by the word processor, or alternatively, it may be a rendering of a file (or a particular page) as may appear when the file is printed. Generally a thumbnail image of the file when printed is called a WYSIWYG thumbnail (What You See Is What You Get).

The drawback of such thumbnails is the overhead that may be incurred when showing a thumbnail representation of a file. For example, if the file has lots of data associated with describing a file in terms of elements and properties (e.g. "square", "size=x,y", "color=blue", "position=2 inches, 4 inches") then before a thumbnail representation can be shown, the file must be interpreted by a program so the image may be rendered. Interpreting and/or rendering may have significant overhead because of the memory and processing resources that may be required to interpret and/or render a thumbnail image. There has been a need for improved utilization of resources when displaying thumbnails.

BRIEF DESCRIPTION

In accordance with one aspect of this disclosure, a printing system user interface is disclosed. The printing system user interface comprises an exception page programming interface configured to perform the following: (1) associate each page of a print job with a page object and a sheet object, wherein the page object and sheet object are linked as separate objects; (2) display visual cues of one or more pages of the print job, wherein the visual cues associate each page of the print job with a page object and a sheet object; (3) selectively associate one or more attributes with a user selected page object wherein the exception page programming interface is configured to modify, if necessary, the linked sheet object attributes consistent with the page object attributes; and (4) selectively associate one or more attributes with a user selected sheet object, wherein the exception page programming interface is configured to modify, if necessary, one or more linked page objects consistent with the sheet object attributes.

In accordance with another aspect of this disclosure, a printing job exception page handling method is disclosed. The printing job exception page handling method comprises associating each page of a print job with a page object and a sheet object, wherein the page object and sheet object are linked as separate objects; displaying visual cues of one or more pages of the print job, wherein the visual cues associate each page of the print job with a page object and a sheet object; selectively associate one or more attributes with a user selected page object wherein the exception page handling method modifies, if necessary, the linked sheet object attributes consistent with the page object attributes; and selectively associate one or more attributes with a user selected sheet object, wherein the exception page handling method modifies, if necessary, one or more linked page objects consistent with the sheet object attributes.

In accordance with another aspect of this disclosure, a xerographic printing system is disclosed. The xerographic printing system comprises an image marking engine; and a print job controller operatively connected to the image marking engine, wherein the print job controller comprises an exception page programming interface configured to perform the following: (1) associate each page of a print job with a page object and a sheet object, wherein the page object and sheet object are linked as separate objects; (2) display visual cues of one or more pages of the print job, wherein the visual cues associate each page of the print job with a page object and a sheet object; (3) selectively associate one or more attributes with a user selected page object wherein the exception page programming interface is configured to modify, if necessary, the linked sheet object attributes consistent with the page object attributes; and (4) selectively associate one or more attributes with a user selected sheet object, wherein the exception page programming interface is configured to modify, if necessary, one or more linked page objects consistent with the sheet object attributes.

BRIEF DESCRIPTION OF THE DRAWINGS

FIG. 21 illustrates an "Unedited Rollover Page—Thumbnail View" of an Exception Page Programming System according to an exemplary embodiment of this disclosure;

FIG. 22 illustrates an "Unedited/Selectable—List View" of an Exception Page Programming System according to an exemplary embodiment of this disclosure;

FIG. 23 illustrates an "Unedited/Selected Page—Thumbnail View (Page 1 has Primary Focus, Page 2 is Associated)" of an Exception Page Programming System according to an exemplary embodiment of this disclosure;

FIG. 24 illustrates an "Unedited/Selected—List View (Page 1 has Primary Focus, Page 2 is Associated)" of an Exception Page Programming System according to an exemplary embodiment of this disclosure;

FIG. 25 illustrates an "Unedited/Selectable Page—Thumbnail View" of an Exception Page Programming System according to an exemplary embodiment of this disclosure;

FIG. 26 illustrates an "Unedited/Selectable—List View" of an Exception Page Programming System according to an exemplary embodiment of this disclosure;

FIG. 27 illustrates an "Unedited/Selectable Sheet—List View" of an Exception Page Programming System according to an exemplary embodiment of this disclosure;

FIG. 28 illustrates an "Unedited/Selected Sheet—Thumbnail View (Page 1 is Selected, Page 2 is Associated)" of an Exception Page Programming System according to an exemplary embodiment of this disclosure;

DETAILED DESCRIPTION

Figure 1:
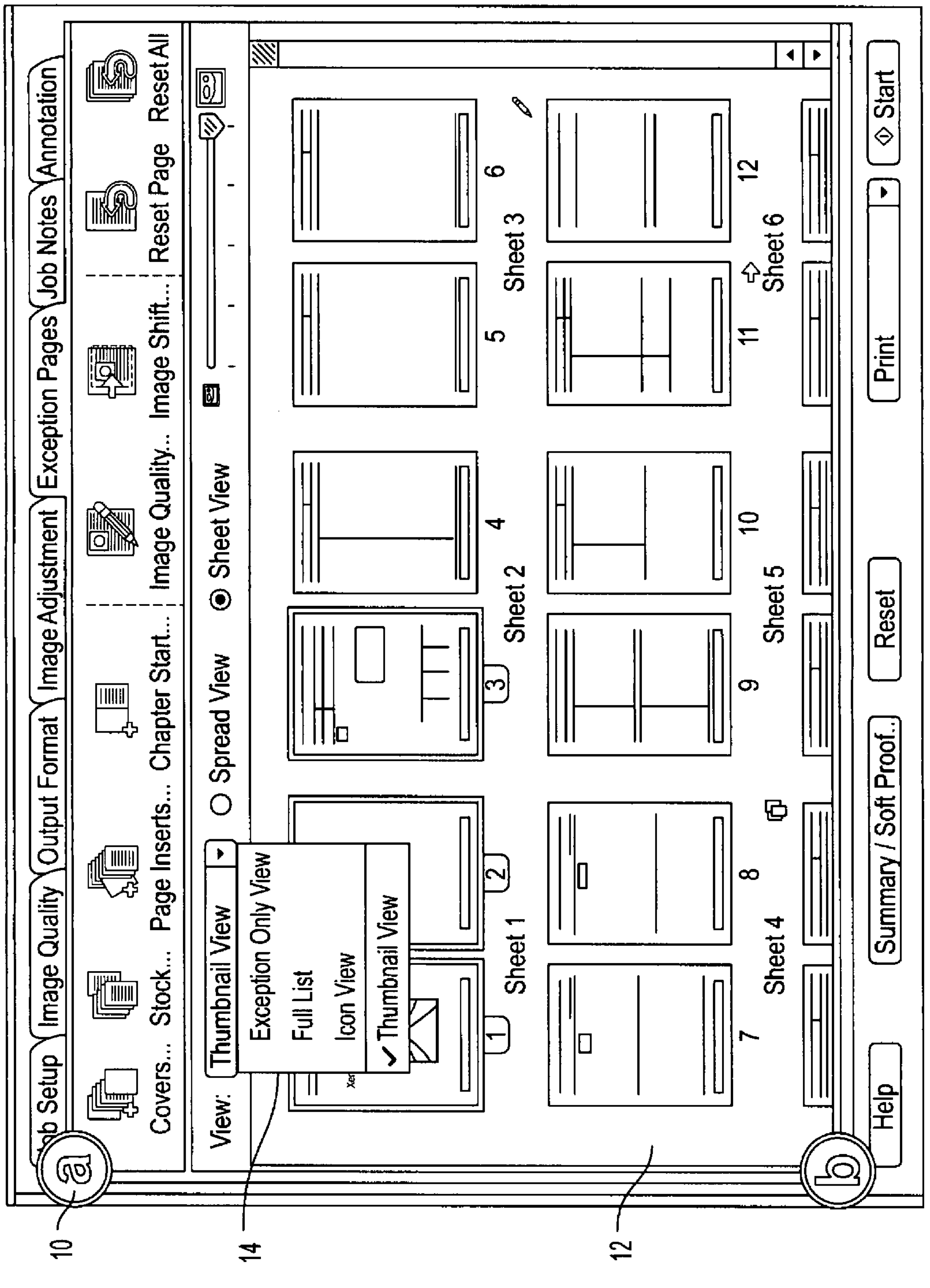
FIG. 1 illustrates the main sections of an Exceptions Pages Tab according to an exemplary embodiment of this disclosure.

This disclosure provides an Exception Page Programming System as related to the management of a printing job. For purposes of this disclosure, the disclosed Exception Page Programming System may be referred to as an Exception Pages Strategy which covers the conceptual, logical and some aspects of the physical design of an Exception Pages Module which may be integrated with a Print Job Setup and Submission Strategy/System.

For purposes of this disclosure, the following terms are defined as indicated.

Body: The pages within a job whose properties are defined at the job level. Contrasts with Exception Pages, which are set at a page level.

Chapter Starts: PDL pages that have been specified to always fall on the right-hand side of a spread (or the front of a sheet). If the specified PDL page does not naturally fall on the right-hand side of a spread, the application inserts a blank PDL page before the Chapter Start to force it to fall in the correct location.

Covers: The first and/or last sheet of a printed job can be specified to be printed as a special kind of Exception Page. User can choose to print on the front and/or back of covers, or to leave the front and back blank. When the user chooses to leave any side of the cover blank, a blank PDL page is used to force the subsequent PDL page onto the next sheet side.

Exception Pages: The pages within a job that are set at a page level. These pages are exceptions to the job-level programming that defines the body of the job.

Homogeneous Range: A range of pages or sheets with the same settings.

Inserts: Paper sheets that are inserted into a print job. Data from the source PDL document is not eligible to be printed on inserts. Inserts can have information generated by the submission tool printed on them (e.g. printing on tabbed inserts). Pre-printed sheets can be loaded into a tray and inserted in a job.

Modulus: The number of pieces in a set of ordered stock. For example, precut tabs are available with a modulus of 3, 4, 5, etc.

Non-Homogeneous Range: A range of pages or sheets in which any page or sheet has a dissimilar setting.

Page: A discrete unit of print-ready data. When rendered for printing, the data is structured into pages. Currently, one Page can be assigned to be printed on each side of a sheet of paper.

PDL: An acronym for Page Description Language. This general term is used to refer to any electronically rendered page. Postscript, PCL and PDF are all PDL file types.

Sheet: The substrate (usually paper) upon which PDL pages are printed.

Sheet-level: Related to the substrate (usually paper), not the PDL data.

Stock Exceptions: The programming of paper stock attributes at a page level.

Exception pages are pages within a finished job that were not included in the original page content of the Page Description Language (PDL) (e.g. Inserts) or contain different feature level programming from the body of the job. These pages are said to be exceptions to the job-level programming that defines the body of the job.

Typically, exceptions can be set for paper stocks (covers, stock exceptions, page inserts), page sequencing (chapter starts), image quality and image shifting. Potential future exceptions include subset finishing (e.g. stapling a range of pages within a job), imposition, and page level annotation.

The key principle of the Exception Pages dialog is the notion of setting up programming at a page level. To support this principle, the Exception Pages dialog provides the ability to select individual pages and sheets within a job.

Key enablers for enhancing the design of the exception pages dialog are the ability to determine the number of pages contained within the PDL that is being printed as well as the actual image data for the pages. It is important that the user specify the document(s) that they want to print before beginning to setup their exception pages, so that the number of PDL pages can be determined and the associated image data can be obtained.

Within Exception Pages, there are 2 types of objects that can be selected and managed, pages and sheets:

Pages are discrete pieces of print-related data contained within the PDL(s) that are to be printed. PDL's are made up of print data that is structured in the form of pages. Features that apply to pages include Chapter Starts, Image Quality and Image Shift. Covers also apply to pages in that the user can specify whether to print on the front or back of the cover.

Sheets are physical pieces of paper. Each sheet has 2 sides (a front and a back) that can be printed on. In a standard (non-imposed) job, 1 PDL page can be mapped to each sheet side. Features that apply to sheets include Covers, Stock Exceptions and Inserts.

The model of the Job Setup & Submission strategy is that feature settings apply to the entire job. The model for the Exception Pages module is that feature settings apply to specific pages or sheets within a job.

Job-Level Programming: Set by the "regular" features that make up the Job Setup & Submission dialog (i.e. the features other than those within the Exception Pages tab). Job-level settings are applied to the entire job. For example, if on the Image Quality tab, the Brightness is increased, every printed page within the final document will be brightened. Within a job, the pages that get their values from the "regular" features make up the body of a job.

Page-Level Programming: Set by the Exception features, which are those found within the Exception Pages module. These are features that are applied to individually identified pages. These individual pages are handled as exceptions to the "body" of the job. When a page, or set of pages is identified, feature programming is applied to just those pages. For example, if within Exception Pages, pages 3 and 5 are lightened, the final document will be printed using the Brightness value specified on the Image Quality tab, but pages 3 and 5 will be printed using the Brightness value specified within the Exception Pages tab.

Within a job, pages flow in the sequence that they are ordered in the PDL. Due to technical limitations, the Exception Pages module does not allow the page order to be altered. It does allow spaces to be added between PDL pages (e.g. the Chapter Starts feature can insert a spacer to force a chapter to start on an odd page). If the user needs to alter the order of the pages in a job, they must go back to the native application to change it.

Usability testing showed that in certain situations, it would be desirable to allow users to alter the order of pages from within the Exception Pages module. Support of this functionality will be considered in the future, if the technical limitations are eliminated.

Figure 38:
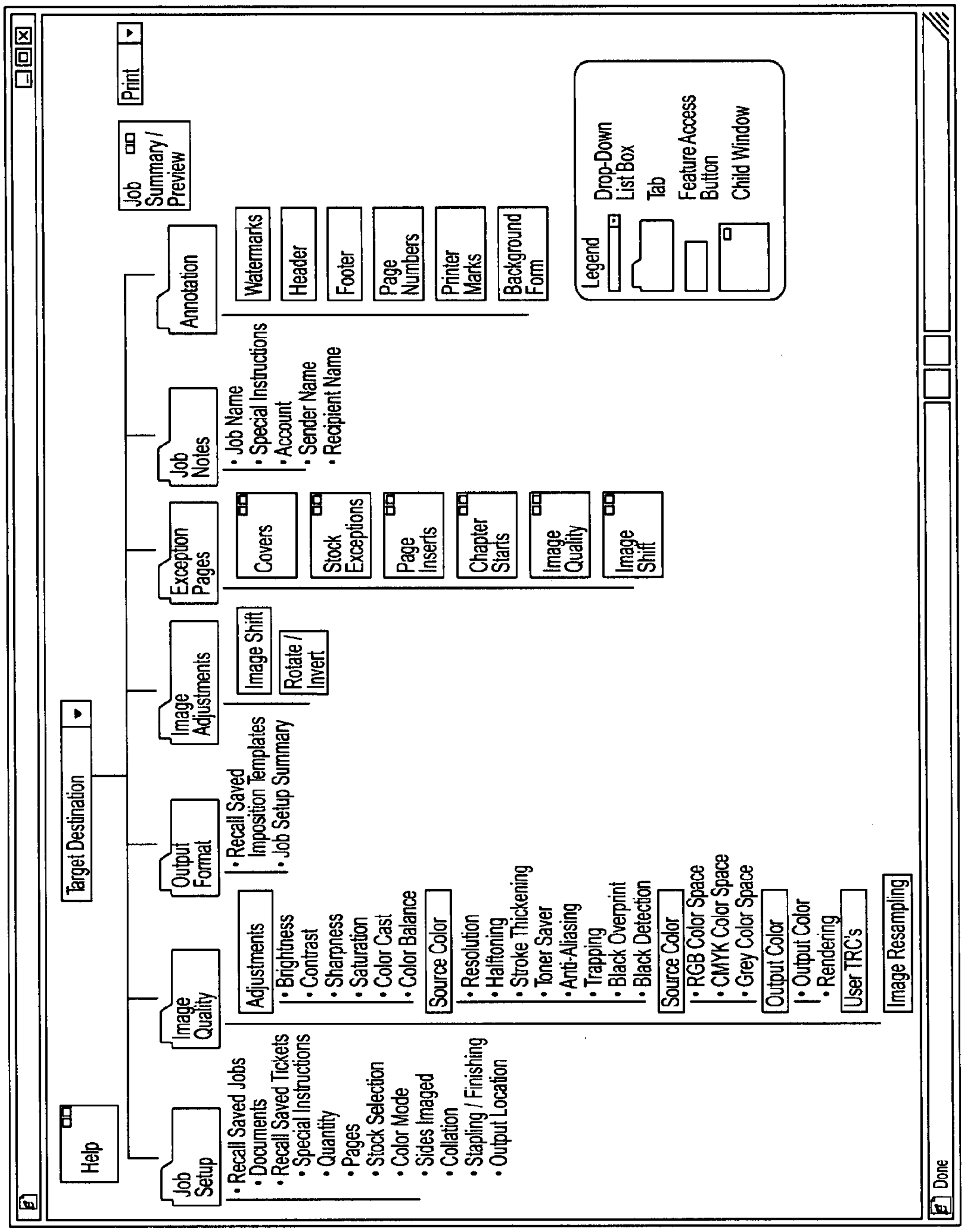
FIG. 38 illustrates a "Job Setup and Submission Architectural Design Diagram" of an Exception Page Programming System according to an exemplary embodiment of this disclosure.

As illustrated in FIG. 38, the Job Setup & Submission strategy provides a modular, scalable and extensible framework. From a logical standpoint, the Exception Pages module integrates within the framework as a major grouping of functionality, or tab.

Within Exception Pages there are two general types of features. One type includes features that have a similar or identical feature within the larger set of job programming features, such as the Image Quality adjustments, Image Shift, and Exception Stock. For these features the presentation and behavior within Exception Pages should be virtually identical to that used in the core job programming dialog. The other type of features are those that are unique to Exception Pages such as Chapter Starts, Inserts, and Covers. It should be noted that both Inserts and Covers do support the ability to define stock type. This aspect should be common with the stock selection dialog found in core job programming.

The six basic functions performed by the Exception Pages module are as follows:

Allows users to select specific pages, and/or sheets within a job, so that each page and/or sheet can be handled individually.

Presents the set of features that are eligible to be applied at a page or sheet level, as exceptions to the body of the job.

Provides means for adjusting the placement of pages and sheets within a job.

Provides a visual representation of the individual pages and sheets that make up a job.

Provides a visual representation of the current exception programming.

Allows the modification of exception page settings.

The Exception Pages module is organized by exception feature. Currently, there are six individual features that can be set up as exceptions, and each has their own child window. From the top level of the Exception Pages module, window bearing buttons provide access to the individual child windows. These child windows can also be accessed through several other means that will be discussed later in the document.

The Exception Pages screen is laid out in two main sections, a) the Button Bar, and b) the View Area as illustrated in FIG. 1, and the user is able to select their preferred view from a view drop down menu 14.

a) Button Bar

The top of the screen is a button bar 10 containing buttons that act on the objects in the View Area below. The feature buttons provide access to their respective properties screens. The Reset Page and Reset All buttons clear Exception Page properties, setting the selected pages or sheets back to the "body" properties. As with any potentially destructive action, a warning/confirmation dialog should be presented before resetting any features. Notably, within individual feature windows, the Reset button sets the selected sheets or pages back to the body properties. If no exceptions have been programmed, the Reset and Reset All buttons are disabled.

If the number of buttons in the Button Bar exceeds the available space, a scroller appears.

b) View Area

The View Area 12 of the screen contains the visual representation of the job, as well as controls that allow the user to change the view, and change the size of icons and thumbnails.

Figure 2:
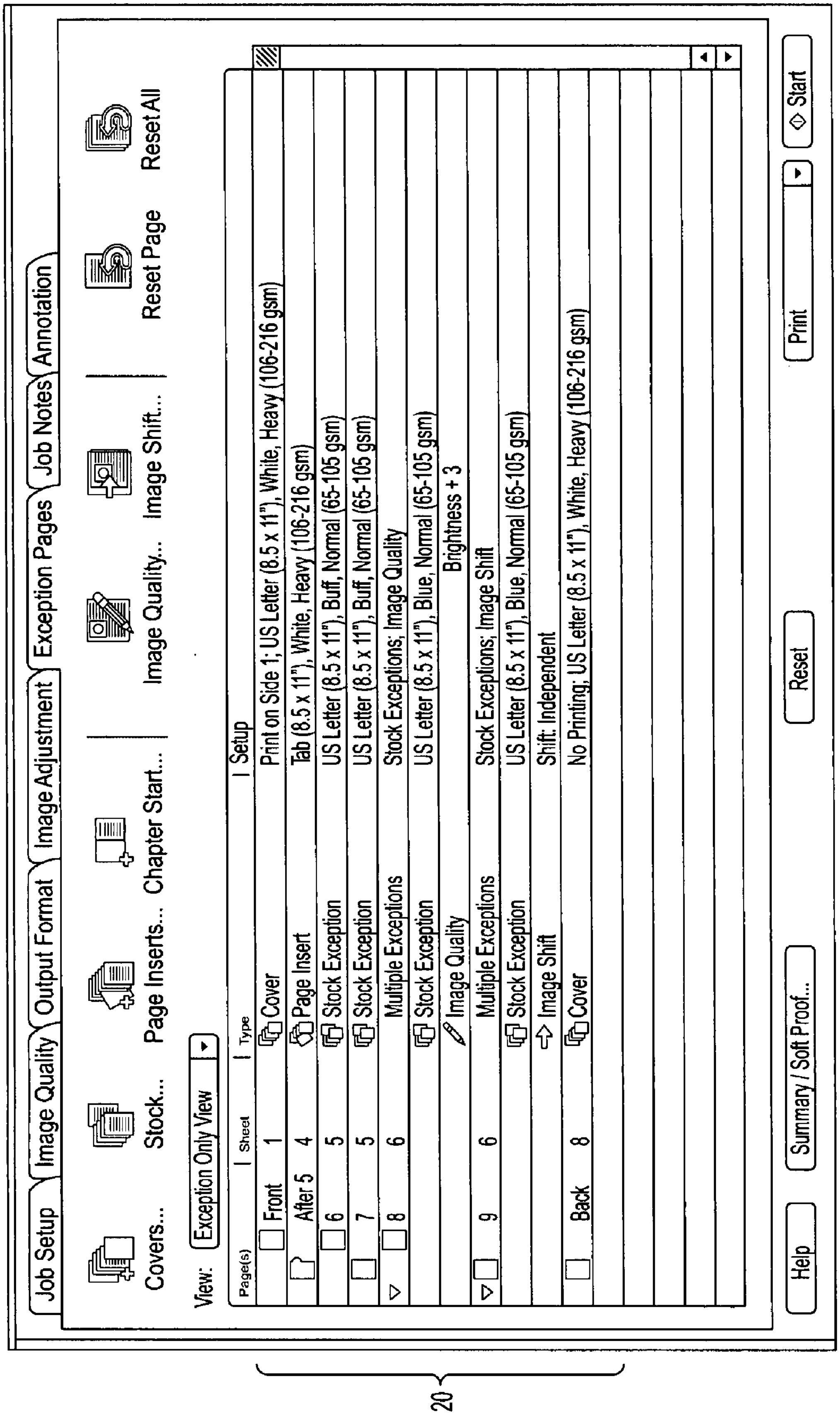
FIG. 2 illustrates an "Exception Only List View" at an Exception Page Programming System according to an exemplary embodiment of this disclosure.

The current job can be represented in a variety of ways within the View Area. The four major views available are:

Exception Only List: As illustrated in FIG. 2, the Exception Only list 20 is a summary of just the pages that have had exception programming applied to them. This view is useful when the user wants to quickly look at a list of just the exceptions.

Figure 3:
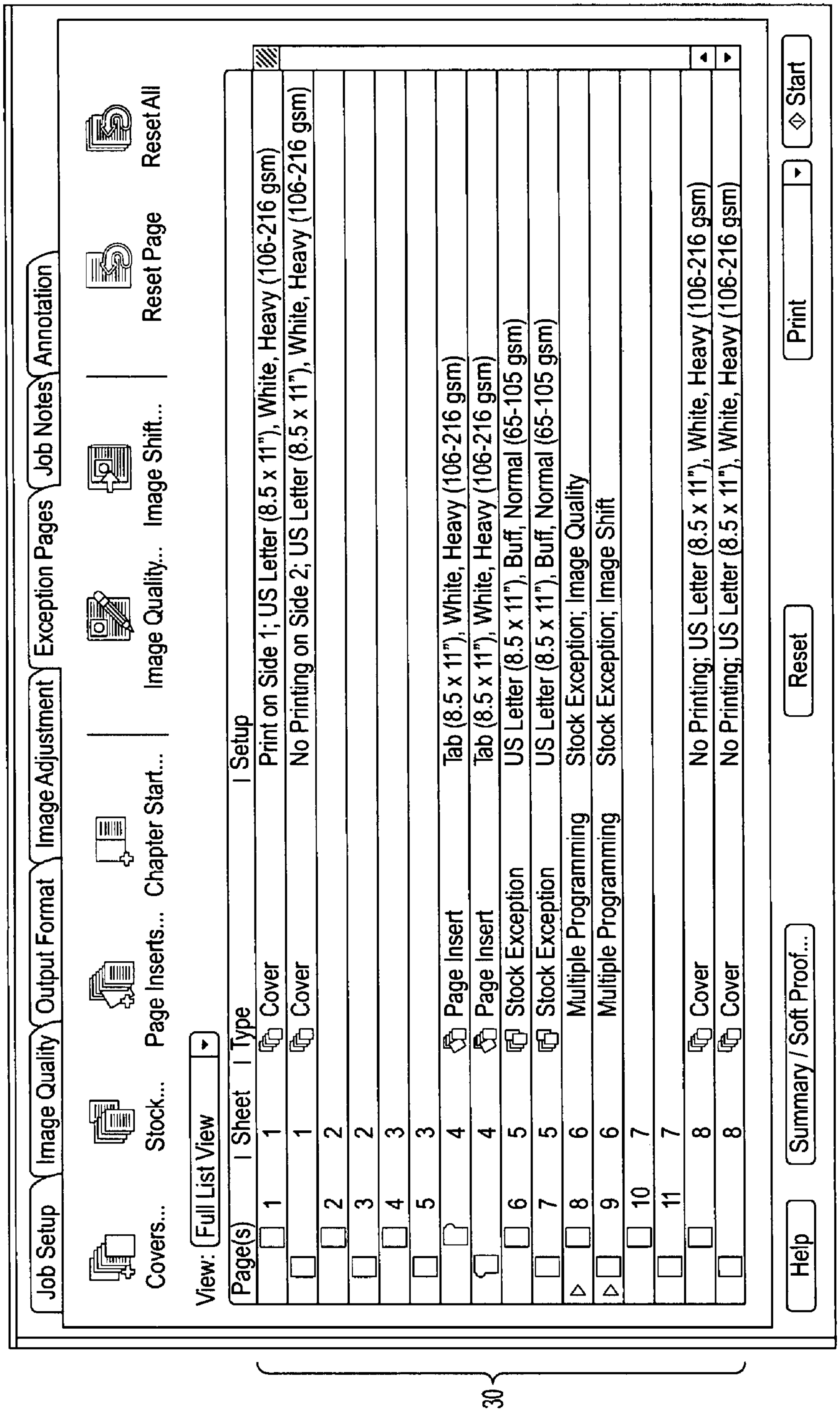
FIG. 3 illustrates a "Full List View" of an Exception Page Programming System according to an exemplary embodiment of this disclosure.

Full List: As illustrated in FIG. 3, the Full List 30 provides an overview of all of the pages in the current job (both the exceptions and the body pages). This view provides an "in context" view of the exceptions within the entire job and is useful when the user wants to manipulate the pages and sheets (e.g. drag & drop to move an insert to a new location).

Figure 4:
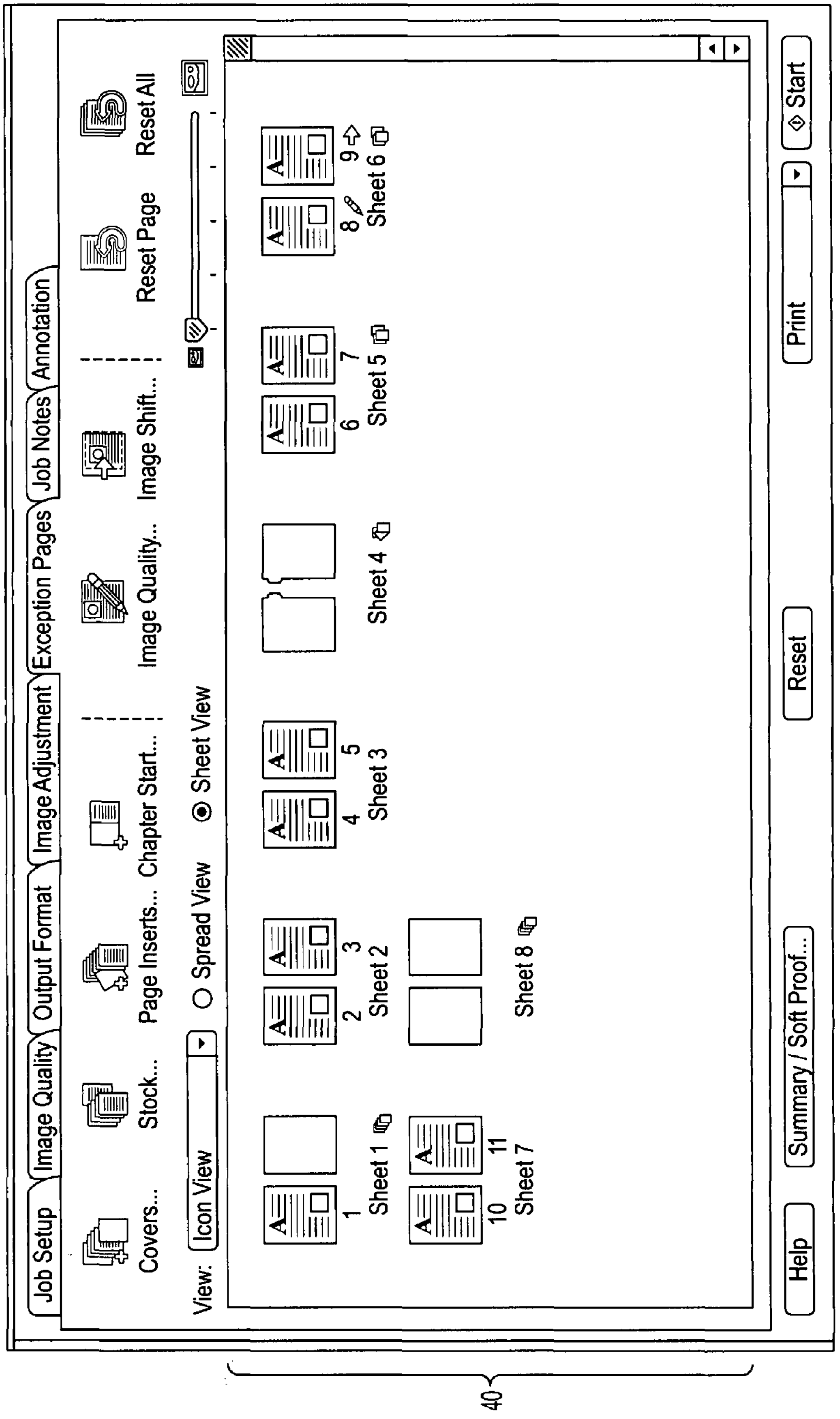
FIG. 4 illustrates an "Icon View" of an Exception Page Programming System according to an exemplary embodiment of this disclosure.

Icon View: As illustrated in FIG. 4, the Icon View 40 represents each Sheet and Page of the job as a mimic. Each mimic is made up of two main components. First is a visual representation of the current Stock, showing type, color, size and orientation. The second component is a generic representation of the PDL pages, which are overlaid on the Sheets they are assigned to. This view is useful when the user wants a quick check of how their PDL pages are mapped to the actual sheet sides. The absence of the Page icon indicates that a sheet side is to be left blank.

Notably, regardless of the binding style (either book or calendar), the Pages and Sheets in the View Area are shown with the implied binding edge oriented vertically. The majority of print jobs are book style. For calendar style jobs, the orientation is rotated so that the binding edge is vertical. In the Icon View, the Page icon can include visual elements to illustrate the orientation of the PDL pages. This is needed to differentiate orientation settings like Head to Head, Head to Toe, etc.

Figure 5:
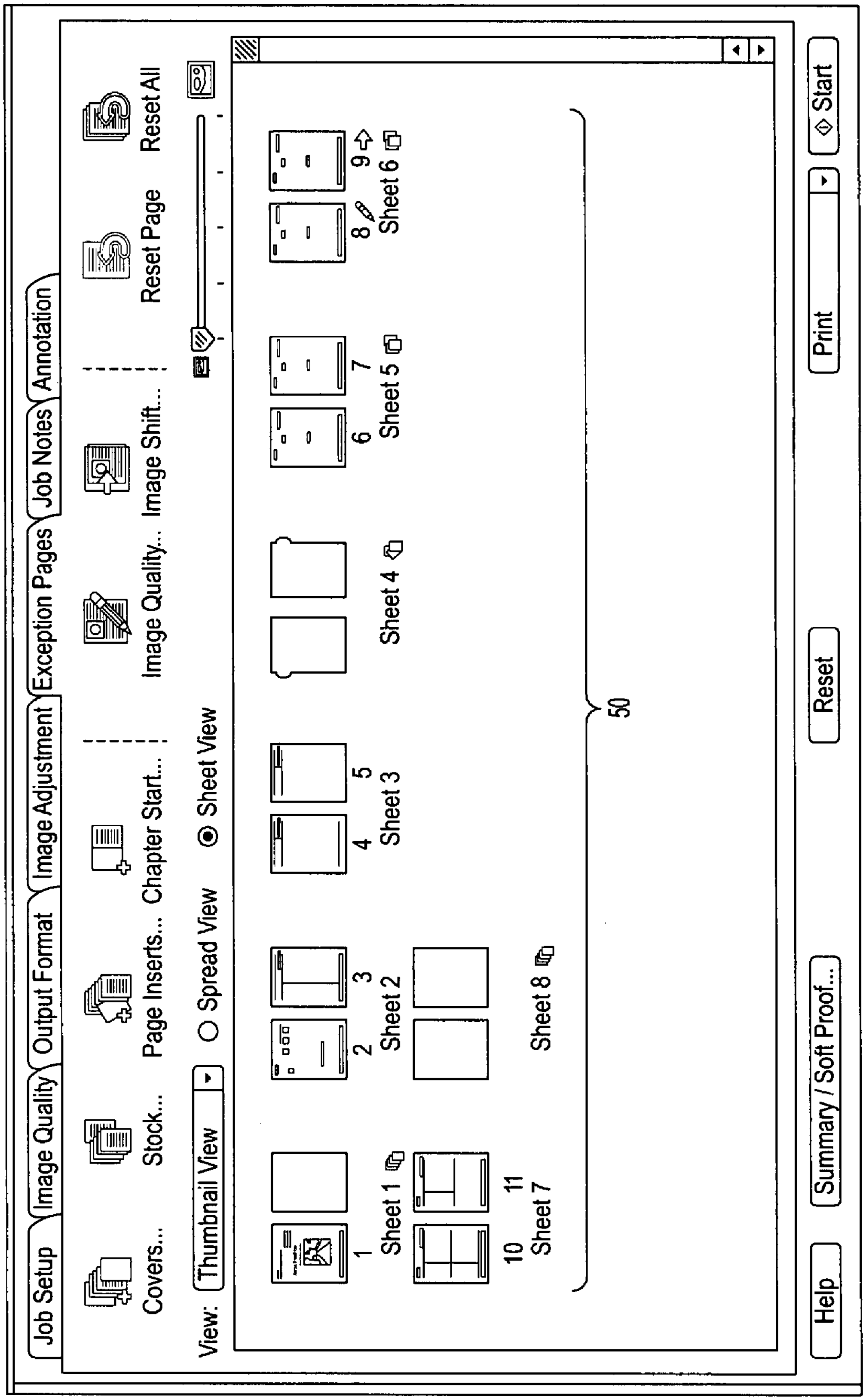
FIG. 5 illustrates a "Thumbnail View" of an Exception Page Programming System according to an exemplary embodiment of this disclosure.

Thumbnail View: As illustrated in FIG. 5, the Thumbnail View 50 also represents each Sheet and Page of the job as a mimic. Each mimic is made up of 2 main components. First is a visual representation of the current Stock, showing type, color, size and orientation. The second component is actual thumbnail images of the job's PDL pages, which are overlaid on the Sheets they are assigned to. This view is useful when the user wants a high fidelity view of how their PDL pages are mapped to the actual sheet sides before printing. In some ways, this view is like a soft proof of the exception programming for the job.

Notably, if the user has defined the output document as one sided, the back side of all of the sheets will be shown as blank in the Full List, Icon, and Thumbnail Views.

Regardless of the binding style (either book or calendar), the Pages and Sheets in the View Area are shown with the implied binding edge oriented vertically. The majority of print jobs are book style. For calendar style jobs, the orientation is rotated so that the binding edge is vertical. The Thumbnails also rotate, indicating whether the job is Head to Head, Head to Toe, etc.

For the Icon 40 and Thumbnail 50 views, there are additional view modifiers available, Sheet View and Spread View. The user can toggle between the view modifiers to select the one that best supports the task they are performing.

In Spread View, the Pages of the job are displayed as if they were a bound booklet. The back of Sheet 1 is displayed next to the front of Sheet 2 (and so on), making it easy to spot errors in the layout of spreads.

Figure 6:
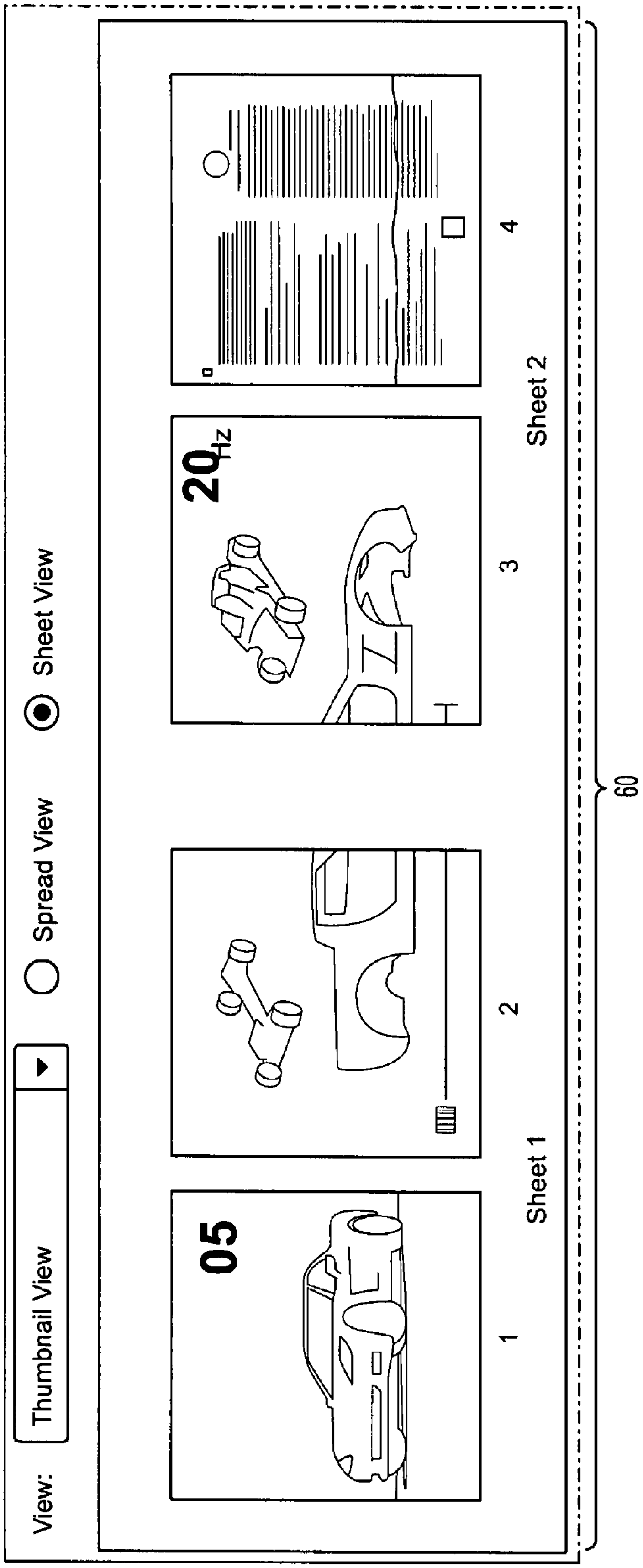
FIG. 6 illustrates a "View Area Displaying Sheet View" of an Exception Page Programming System according to an exemplary embodiment of this disclosure.

As illustrated in FIG. 6, in Sheet View 60, the job is portrayed as a series of sheets of paper. The focus is on the individual Sheets, so the front and back of each Sheet are displayed next to each other as a set.

Figure 7:
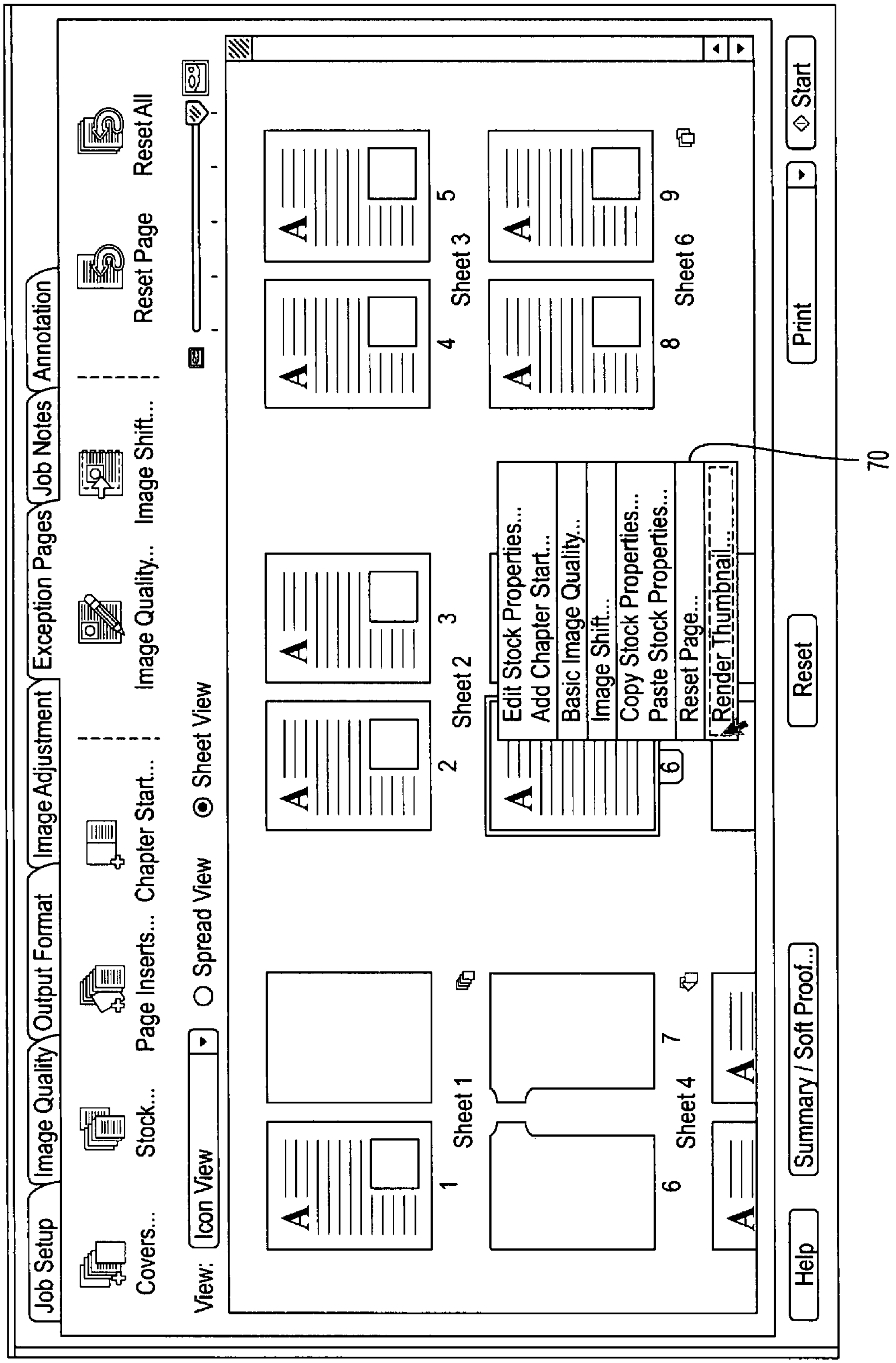
FIG. 7 illustrates a "Right-mouse Context Menu for Rendering Thumbnail" of an Exception Page Programming System according to an exemplary embodiment of this disclosure.
Figure 8:
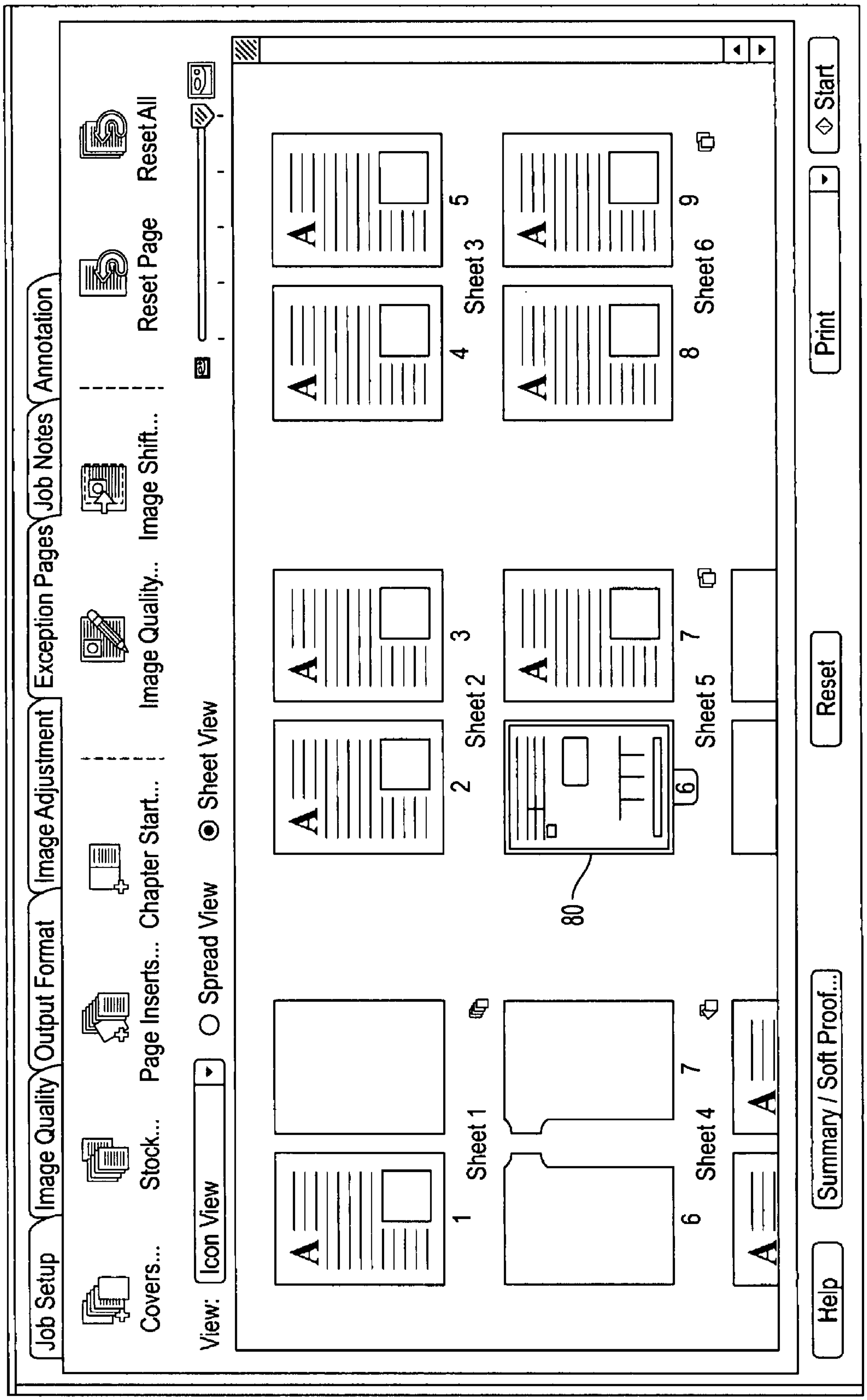
FIG. 8 illustrates a "Selective Rendering of Thumbnail" of an Exception Page Programming System according to an exemplary embodiment of this disclosure.

Notably, as illustrated in FIGS. 7 and 8, rather than forcing the user to make an "all or nothing" decision with regard to thumbnails (render thumbnails for all pages in the Thumbnail view, and render none in the Icon view), a feature is provided within the Icon view that enables users to selectively render pages. To do this from the Icon view, the user must first select (highlight) the desired pages in the View Area. Then they must right-mouse (or hold down the Control key and click with a one-button mouse) and select "Render Thumbnail" 70 from the context menu. This allows the user to selectively render key pages 80 (e.g. to insure that a spread flows correctly). While rendering the Thumbnail, the system should show some type of process indicator.

Figure 9:
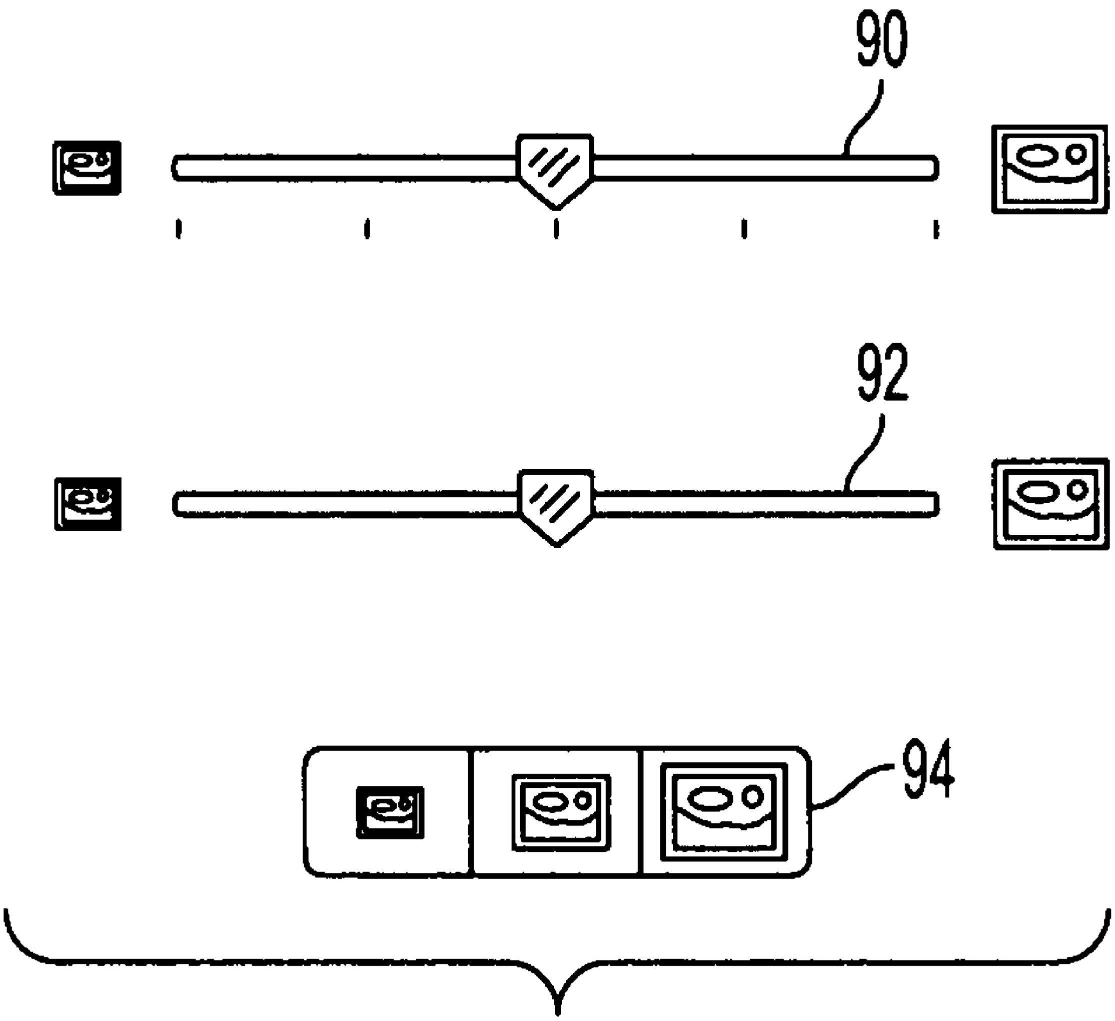
FIG. 9 illustrates "Page 1 Sheet Size" sliders and buttons of an Exception Page Programming System according to an exemplary embodiment of this disclosure.

As illustrated in FIG. 9, when in the Icon or Thumbnail view, a control is provided to allow the user to adjust the size of the page/sheet images that are shown in the View Area. Sometimes users want to fit as many images on the screen as possible, and other times, they want large images to allow them to see the PDL thumbnail clearly. Strategically, the desired state is to have a slider 90 and 92, to control the size of the images. As a fall-back, a set of buttons 94 with limited selections like small, medium and large is acceptable.

In order to increase the productivity of setting up new Exception Pages jobs and editing existing ones, a variety of interaction behaviors are supported. In all of the views, Sheet(s) and Page(s) are object oriented, allowing the user to interact with them. The common interaction behaviors that are supported within the Microsoft Windows and Macintosh desktops are supported within the Exception Pages tab.

Click: Clicking on a Page selects the Page (and by association, the Sheet that the Page sits on).

Shift-click: While holding down the Shift key, the user can extend their selection by clicking on additional Pages. If the user clicks on Page 1, then holds down the Shift key and selects Page 10, Pages 1 through 10 are selected.

Option-click: While holding down the Control key (or the Command key on a Mac), the user can extend their selection by clicking on additional Pages. If the user clicks on Page 1, then holds down the Option key and selects Page 10, Pages 1 and 10 are selected, but the Pages between remain unselected.

Click & Drag: The user can click on a location in the view area and drag to create a rectangular selection area. All pages within the rectangle will be selected. The selection can be extended by holding down the Shift or Option key and dragging additional rectangular selections.

Figure 10:
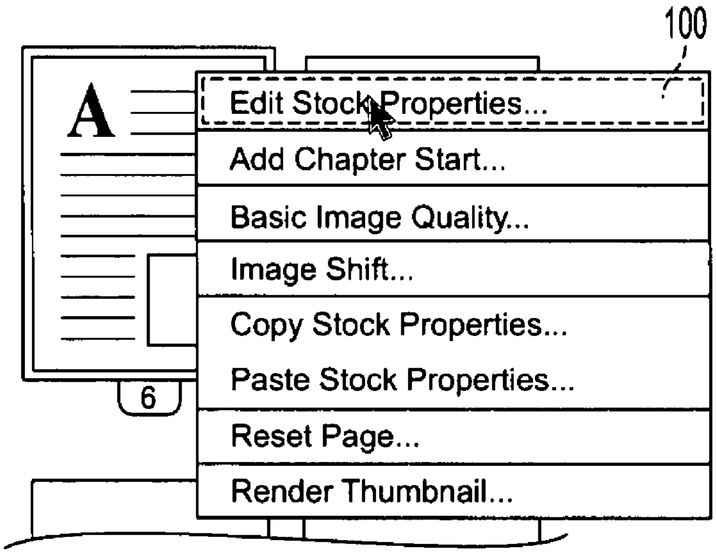
FIG. 10 illustrates a "Right Click Context Menu" of an Exception Page Programming System according to an exemplary embodiment of this disclosure.

Right-click: As illustrated in FIG. 10, right-mousing (or holding down the Control key and clicking with a one-button mouse) on a Page, Sheet, or range of Pages or Sheets brings up a context menu 60 for the selected objects. The menu provides access to the available options for the selected objects.

Keyboard Commands: In general, the keyboard commands can be supported. For example, the Tab key could move focus from object to object within the View Area. The Arrow keys could change the location of the Insertion Point. Command-C and Command-V could be used to copy and paste an object's properties.

Figure 11:
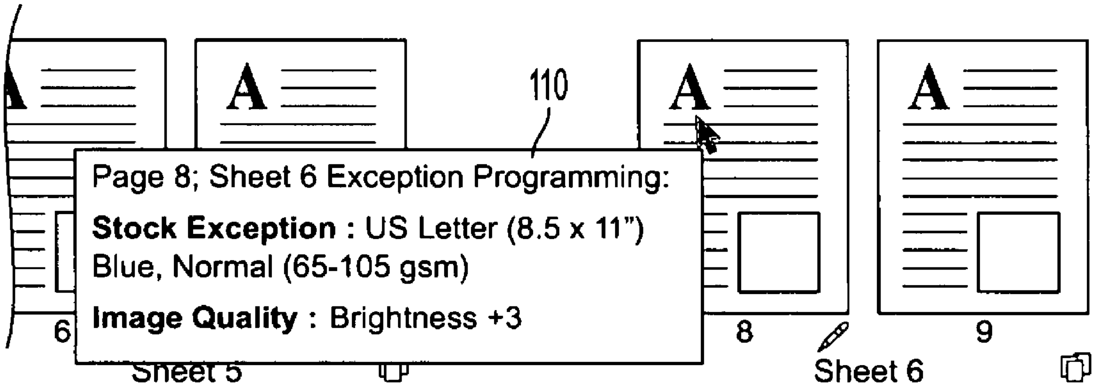
FIG. 11 illustrates a "Rollover Tool Tip" of an Exception Page Programming System according to an exemplary embodiment of this disclosure.

Rollover: As illustrated in FIG. 11, hovering the mouse over a Page brings up a Tool Tip 110 containing details about the Page (for pages without exception programming, the "body" stock programming is displayed).

Drag & Drop: There are 2 main behaviors for drag & drop within the View Area. Each behavior is associated with a particular type of object. Dragging & Dropping a Page Insert, or range of Page Inserts physically moves the location of the Insert(s). With all other Exception Pages, dragging & dropping picks up the exception page properties of the selected object(s) and applies the properties to the target object(s). Using the Alt key (or Option on the Mac) as a modifier, the user would copy the Insert or page properties.

Figure 12:
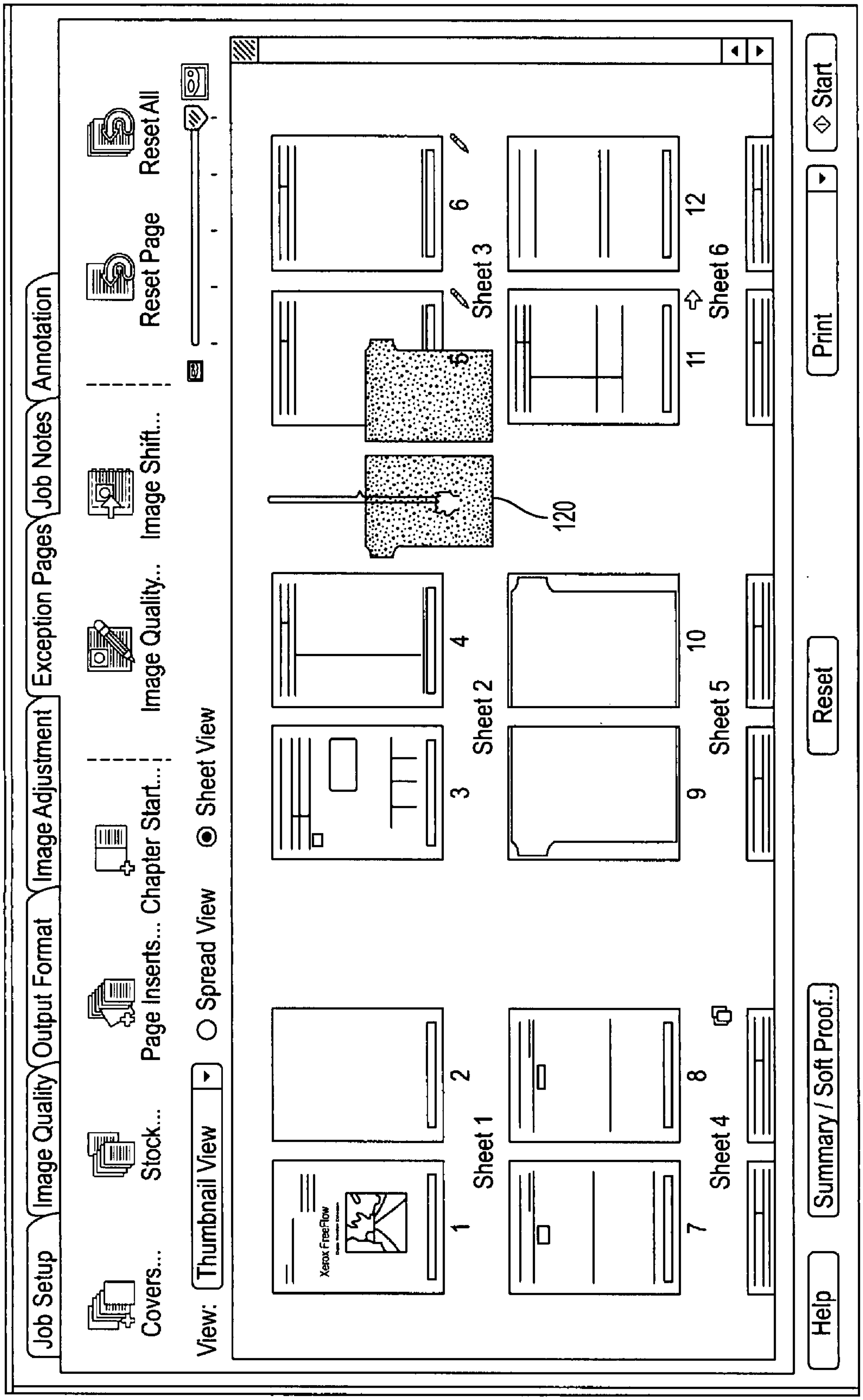
FIG. 12 illustrates a "Drag and Drop—Insert (Sheet 5) Being Moved After Sheet 2" of an Exception Page Programming System according to an exemplary embodiment of this disclosure.
Figure 13:
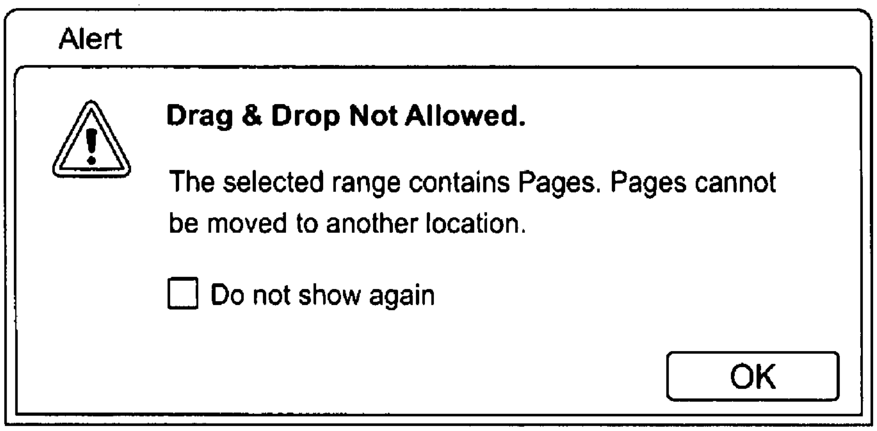
FIG. 13 illustrates an "Alert Window" of an Exception Page Programming System according to an exemplary embodiment of this disclosure.

As a convenience to users, the Exception Pages module allows multiple objects (i.e. Pages, Sheets or Inserts) to be selected. However, different objects support different interaction behaviors. This means that the design allows users to select any combination of objects that they want, but it restricts the allowed interaction behaviors, based on the selected objects. As illustrated in FIG. 12, in the case of behaviors like drag & drop 20, the user can drag any group of objects, but when the user attempts to drop them on an illegal target, the action is disallowed (for example, a "snap back" behavior could be implemented). To inform the user of why the action was disallowed, an alert could also be raised, see FIG. 13.

When a single object is selected, all of the supported interaction behaviors area allowed. When more than one object is supported, the interaction behaviors that are supported are determined by 3 key factors:

The type(s) objects that are selected. Pages and Sheets have different properties than Inserts (inserts are physical pieces of paper that cannot receive a PDL Page). Therefore, the interaction behaviors that are supported for Pages and Sheets are slightly different than those supported for Inserts. For instance, dragging and dropping a group of Inserts physically moves them. Dragging and dropping a group of Pages and/or Sheets is not allowed.

The sequence of the objects. When a sequence of selected Inserts is consecutive, they can be treated as a block. The block of Inserts can be dragged from one location to another, and the result is predictable. If the sequence is not consecutive (i.e. there are gaps with unselected Inserts in the range) then drag & drop is not allowed, because the result is unpredictable.

The similarity of the objects. When all of the objects in a selected group are homogeneous (their properties are identical) their properties can handled collectively. Their properties can be copied (since they are all the same) and pasted. When a feature window is opened (either using a context menu, or the Button Bar), the settings can populated with those of the group. When the objects in a selected group are non-homogeneous (they are dissimilar), their properties cannot be handled collectively. Their properties cannot be copied and pasted. When a feature window is opened, a warning dialog is raised, informing the user that a non-homogeneous range has been selected, and that the features will be populated with the default settings (the settings for the body of the job).

The following table shows the supported interaction behaviors for the various combinations of object types, sequences and similarities.

TABLE 1

Objects and Range Types Mapped to Interaction Behaviors

| Object & State | Context Menu Properties | Drag & Drop | Copy & Paste | Button Bar Features |
|---|---|---|---|---|
| Single Page-Multiple Exceptions | Can access each of the current exception features | Move all exception properties (default and non-default) | Copy and Paste all exception properties (default and non-default) | Open appropriate properties window and display current settings |
| Multiple Consecutive Pages Homogeneous | Can access each of the current exception features | Not allowed | Copy common properties only (not page range) and paste on destination page. | Open appropriate properties window and display current settings. |
| Multiple Non-Consecutive Pages Homogeneous | Can access each of the current exception features | Not allowed | Copy common properties only (not page range) and paste on destination page. | Open appropriate properties window and display current settings. |
| Multiple Consecutive Pages Non-Homogeneous | Message warning of non-homogeneous range. Then open exception feature with default (body) settings. | Not allowed | Not allowed | Message warning of non-homogeneous range. Then open exception feature with default (body) settings. |
| Multiple Non-Consecutive Pages Non-Homogeneous | Message warning of non-homogeneous range. Then open exception feature with default (body) settings. | Not allowed | Not allowed | Message warning of non-homogeneous range. Then open exception feature with default (body) settings. |
| Multiple Consecutive Inserts Non-Homogeneous | Message warning of non-homogeneous range. Then open exception feature with default (body) settings. | Allowed. Moves sheets to new location. | Allow | Message warning of non-homogeneous range. Then open exception feature with default (body) settings. |

TABLE 1-continued

| Objects and Range Types Mapped to Interaction Behaviors | | | | |
|---|---|---|---|---|
| Object & State | Context Menu Properties | Drag & Drop | Copy & Paste | Button Bar Features |
| Multiple Non-Consecutive Inserts Non-Homegenous | Message warning of non-homogenous range. Then open exception feature with default (body) settings. | Not allowed. | Not allowed. | Message warning of non-homogeneous range. Then open exception feature with default (body) settings. |

There are two methods for interacting with Sheet(s) and Page(s); the indirect method and the direct method.

Indirect: With the indirect method, the user clicks on the desired feature's window bearing button to bring up that feature's child window. From the child window, they specify the Sheet(s) or Page(s) that they want to affect with the feature.

Direct: With the direct method, the user first selects the Sheet(s) or Page(s) they want to affect within the View Area. Second, the user has the option to click on a feature's window bearing button, which brings up the child window with the Range populated with the selected Sheet(s) or Page(s). Other methods of direct control include double clicking, right mousing or dragging & dropping selected Sheet(s) and Page(s).

Pages are represented as table rows when in the Full List view or the Exception-Only List view.

Figure 14:
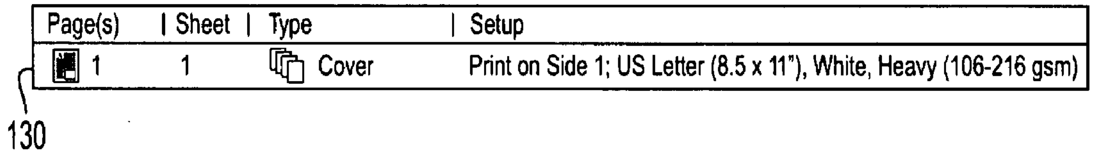
FIG. 14 illustrates a "Single Exception Table Row" of an Exception Page Programming System according to an exemplary embodiment of this disclosure.

Single Exception: As illustrated in FIG. 14, when a page has only one exception, it is represented as a single table row 130. The Setup column of the View Area shows a summary of the Exception details.

The user can perform operations on table rows (e.g. drag & drop).

Figure 15:
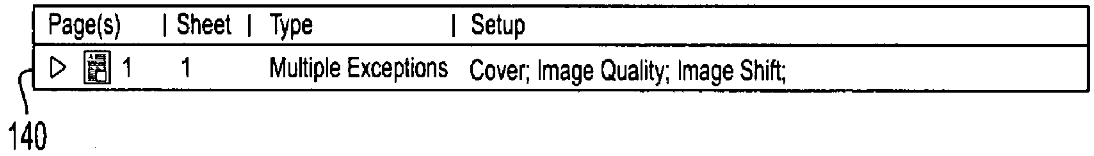
FIG. 15 illustrates a "Multiple Exceptions—Collapsed Table Row" of an Exception Page Programming System according to an exemplary embodiment of this disclosure.

Multiple Exceptions/Collapsed: As illustrated in FIG. 15, in the list views, when a Page has more than one exception attribute specified, it appears in a collapsed, but expandable state 140. In the collapsed state, a triangular Turner icon (pointing to the right), indicates that the table row can be expanded. When the Turner icon is clicked, the table row expands. When there are multiple exceptions, the Setup column lists the Exception Features that have been setup, but not the details.

The user can perform operations (e.g. drag & drop) on collapsed table rows. These operations apply to all of the exceptions contained within the collapsed table row.

Figures 16, 17:
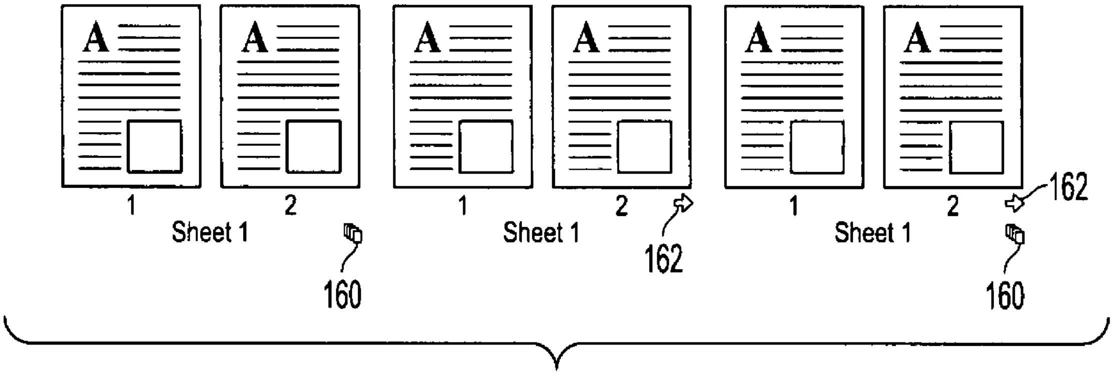
FIG. 16 illustrates a "Multiple Exceptions—Expanded Table Row" of an Exception Page Programming System according to an exemplary embodiment of this disclosure.
FIG. 17 illustrates a "Single Exceptions Icons at the Sheet and Page level" of an Exception Page Programming System according to an exemplary embodiment of this disclosure.

Multiple Exceptions/Expanded: As illustrated in FIG. 16, in the list views, when a Page has more than one exception attribute specified, it can appear in an expanded state 150. In this state, a triangular Turner icon appears (pointing down), indicating that the parent table row is expanded. When expanded, an individual child table row appears for each Exception Feature that has been setup. The child table rows are given a visual treatment (they appear to be recessed) to associate them with the parent table row.

Users can perform operations on the parent table row and have the operation apply to all of the child table rows. They can also perform operations on the individual child table row(s) and have the operations only apply to the selected table row(s).

In the Icon and Thumbnail views, Pages are represented by dynamic page mimics. When exception programming has been set up for a Page or a Sheet, the exception(s) are indicated by the presence of an icon.

Single Exception: As illustrated in FIG. 17, when a single exception has been set up on a Page or Sheet, an icon 160 and 162 is shown. The icon specifically represents the single exception that has been setup (Covers, Insert, Image Quality, etc.). When clicked the icon takes the user to the appropriate properties window (equivalent to double clicking the page). The icon can be associated with either a Page, or a Sheet.

Figure 18:
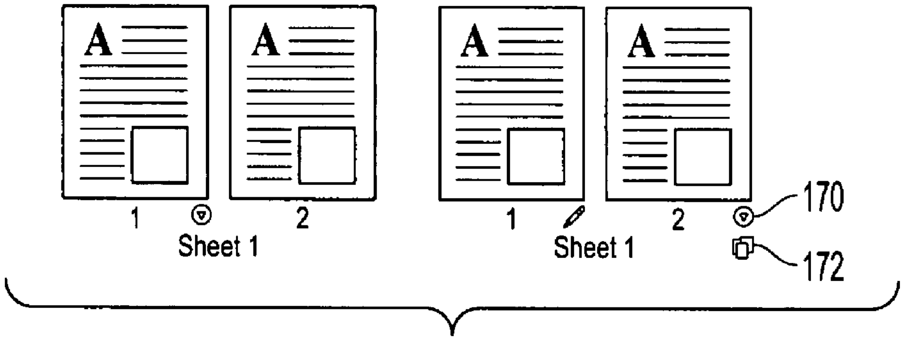
FIG. 18 illustrates a "Multiple Exceptions Page Icon Examples" of an Exception Page Programming System according to an exemplary embodiment of this disclosure.

Multiple Exceptions: As illustrated in FIG. 18, when multiple exceptions have been set up on a Page, a non-specific icon appears 170 and 172. The icon is generic in that it indicates the presence of exception programming, but not specifically what, or how many exceptions are applied. The icon can only be associated with a Page. Stock Exceptions, including Covers, are the only type of Sheet level programming.

Figure 19:
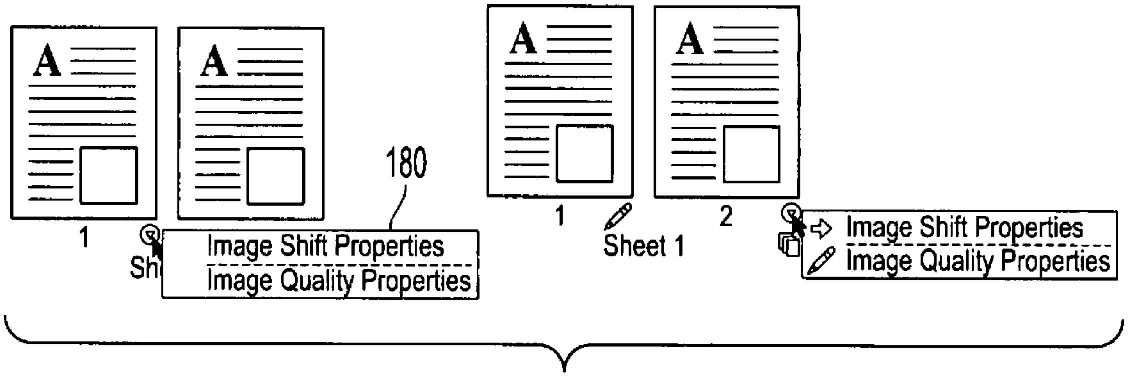
FIG. 19 illustrates a "Multiple Exceptions Page Icon Menu Examples" of an Exception Page Programming System according to an exemplary embodiment of this disclosure.

The icon not only indicates the presence of programming, it also has a behavior. As illustrated in FIG. 19, on a mouse click, a menu 180 appears which shows a specific icon for each type of exception programming that has been applied to the Page. The user can click any of the menu icons and be taken to the appropriate properties window.

Sheets and Pages appear in both the List Views and the Icon & Thumbnail Views. In the List Views, they are presented as list items and in the Icon and Thumbnail Views they are presented as dynamic mimics. The Sheets and Pages are selectable objects, therefore they have states associated with them. Common visual cues and behaviors have been applied to the Pages/Sheets in the List Views and in the Icon and Thumbnail Views to maximize coherence.

Due to the relationship between Pages and Sheets, the Full List, Icon View and Thumbnail View share 2 states that are unique to CUE Exception Pages, Primary Focus and Secondary Focus. It is important to note that although Sheets and Pages are separate objects, they are closely related, and therefore, their states are linked. Each Sheet is made up of 2 sides, and each side can contain a Page. If a Page is selected, it is given primary focus, and the Sheet upon which it sits is given secondary focus. In the case of features that affect the entire sheet (e.g. a stock exception), the entire Sheet's properties (both sides) must be edited.

In order to maintain coherence between the interactions and behaviors of objects in the list views (Exception Only and Full List) and mimic views (Icon View and Thumbnail View), visual treatments have been used consistently to indicate states. The visual treatments include:

Default appearance (No additional visual treatments)—Selectable State

Medium Blue Highlight (Icon/Thumbnail Views Only)—Rollover State

Dark Blue Highlight—Selected State (Primary Focus)

Light Blue Highlight—Associated State (Secondary Focus)

Gray Highlight with Multiple Exceptions Icon—Exception Programming has been performed Recessed Well (List Views Only)—Expanded Exception Page or Sheet The following are the object states, with visual treatments, applied to the list and mimic views.

Figure 20:
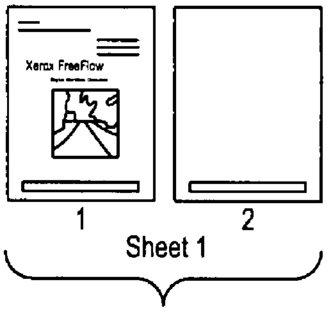
FIG. 20 illustrates an "Unedited/Selectable—Thumbnail View" of an Exception Page Programming System according to an exemplary embodiment of this disclosure.

Unedited/Selectable: As illustrated in FIGS. 20 and 21, this is the default appearance for objects before Exception Programming has been performed.

Figure 29:
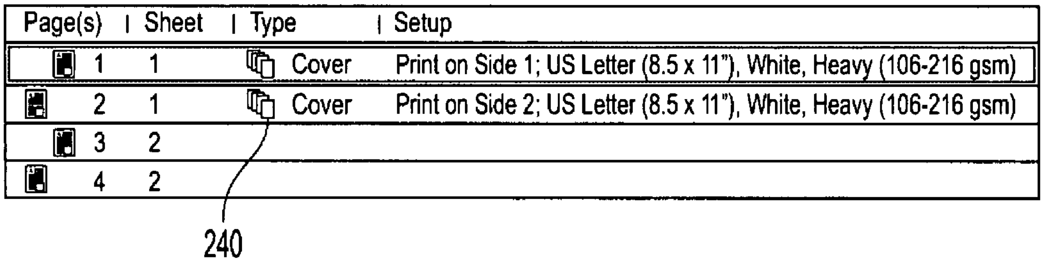
FIG. 29 illustrates an "Unedited/Selected Sheet—List View (Page 1 is Selected, Page 2 is Associated)" of an Exception Page Programming System according to an exemplary embodiment of this disclosure.

Unedited Rollover: As illustrated in FIG. 29, this is the state where the user rolls the mouse over a page that has not yet been made an Exception Page. This state is only applicable in the Icon and Thumbnail View.

Unedited/Selected: As illustrated in FIGS. 23 and 24, this is the state when the user selects an object before it has been made an Exception Page. The selected Page has focus, and the entire sheet, including the page on the other side of the sheet, is associated using secondary focus treatment. Only the associated page receives the secondary focus in the list views.

Edited/Selectable: As illustrated in FIGS. 25-27, this is the state when an object has been made an Exception Page, but is not selected. This may include an individual page or an entire sheet depending on the type of exception programming applied.

Edited/Selected: As illustrated in FIGS. 28 and 29, this is the state when an object has been made an Exception Page and is selected. The selected Page has focus, and the Page on the other side of the Sheet is associated. The only difference between this state and the Unedited/Selected state is the presence of the exception icon 240 in the case of the icon or thumbnail views and the exception icon and exception description in the list views.

The insertion point indicator provides two functions.

For indirect setup methods, it indicates the location at which the new object should be inserted. For instance, if the insertion point indicator is placed after page 4 in the View Area, when the user clicks on "Inserts" button in the button bar, the child window opens with the "Location" and "Page(s)" fields set to After page 4.

For drag & drop, the cursor defines the insertion point of the "drop". As the user drags the object(s) in the View Area, the insertion point indicator moves along with the cursor. When the mouse button is lifted, the object(s) are inserted at the appropriate place.

To place the insertion point within the View Area, the user must click the mouse in a valid location. The only valid locations are the spaces between Sheets. When the mouse hovers over the spaces between Sheets, the cursor changes to indicate that it is a valid location. Once the insertion point indicator is placed, the Arrow key on the keyboard could be used to alter its location.

Figure 30:
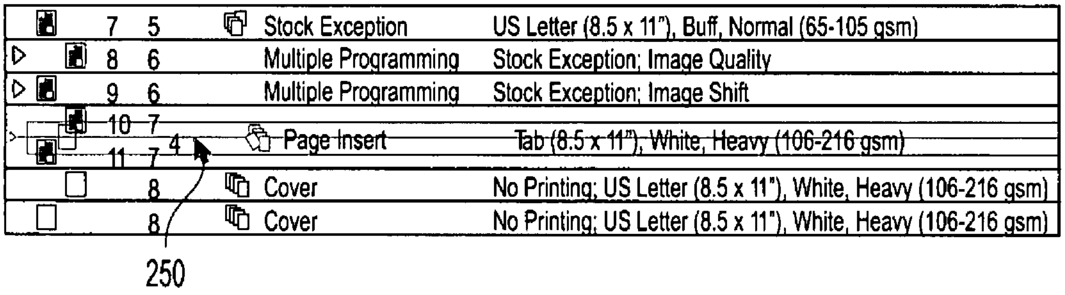
FIG. 30 illustrates an "Insertion Point Indicator—List View" of an Exception Page Programming System according to an exemplary embodiment of this disclosure.

As illustrated in FIG. 30, in the list views, the insertion point indicator for drag & drop is a highlighted line 250 between table rows.

Figure 31:
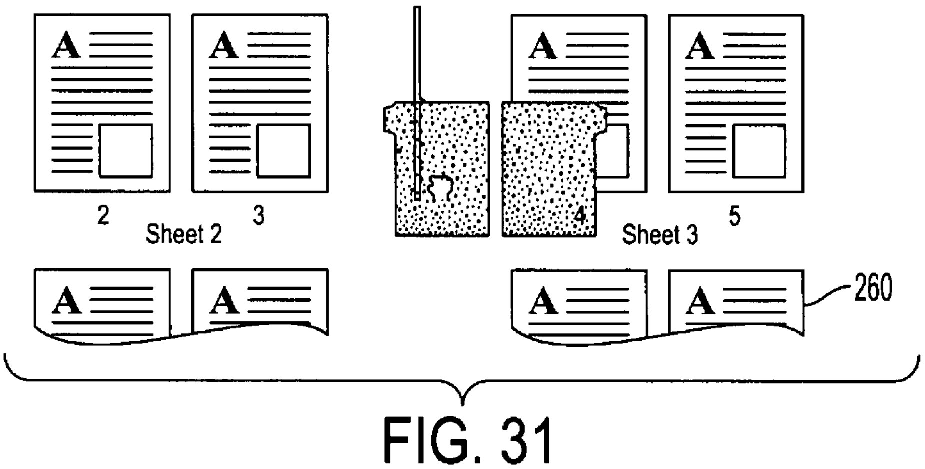
FIG. 31 illustrates an "Insertion Point Indicator—Icon View" of an Exception Page Programming System according to an exemplary embodiment of this disclosure.

As illustrated in FIG. 31, in the mimic views, the insertion point indicator is a colored icon 260 that is placed between Sheets and Pages.

Each of the supported exception features (Covers, Stock, Inserts, Chapter Starts, Image Quality and Image Shift) has its own properties window. The properties windows are modal (the user must dismiss the window in order to interact with the window behind it). There are two ways to access a feature's properties window.

Window bearing button: The user can click on the appropriate feature's window bearing button from the Button Bar. The feature buttons state (either selectable or disabled) is determined by the objects selected in the View Area. For example, if page 10 of a 20 page document is selected, the Covers button is disabled. Also, if an Insert (a sheet that is not eligible to receive a PDL page) is selected, the Chapter Starts, Image Shift and Image Quality buttons are disabled.

Right-mouse: The user can highlight a page or range of pages, and right-mouse to bring up a context menu. The menu only provides access to the eligible features for the selected object (page, sheet, or range of pages or sheets). For example, if a range of 3 consecutive sheets were selected, the context menu would not provide the "Chapter Start" option.

Each feature's properties window contains a "Range" field. The range field specifies the range of pages or sheets that will be affected by the feature settings. If there are pages or sheets selected when the properties window is opened, the range field is populated with the page numbers of the selected pages (Notably, the range field is always editable, even when prepopulated). If no pages or sheets are specified when the properties window is opened, the user must manually enter them.

There are two different types of page ranges that must be handled:

Homogeneous—These are ranges of pages that have the exact same settings for the current feature. For example, within the Image Shift feature, all pages in the range have a 1 mm shift. Notably, the previously mentioned range of pages could have non-homogeneous settings for a different feature.

Non-Homogeneous—These are ranges of pages where any one setting on any one page (within the current feature) is different.

It is important to distinguish between homogeneous ranges and non-homogeneous ranges when opening a feature window. If the range is homogeneous, the feature window can be populated with the settings that are common to the range. If the range is non-homogeneous, it is impossible to load the range's settings into the feature window. In that case, a warning dialog is raised, informing the user that a non-homogeneous range has been selected, and that the features will be populated with the default settings (the settings for the body of the job). Once the user changes the settings in a feature window and closes the window, every page or sheet in the range has its properties changed.

Notably, all exception feature's windows include a Reset button. The feature-level Reset button resets the current range of pages to the settings of the body of the job. It complements the Reset and Reset All buttons that appear in the Button Bar.

The Covers window allows the user to specify stock attributes for the first and last sheet in their job, and to specify whether to have the PDL data printed on the covers.

Covers is a unique combination of the Stock Exception, Inserts, Sides Imaged and Chapter Starts features. They are specialized in that they are restricted to the first and/or last sheet of a job. The user can choose to use a different stock (e.g. heavyweight, or colored) for the covers and they can also choose how they want images printed on the covers. The method for specifying a paper stock within the Covers dialog is identical to how it is done from the Stock Selection feature in the main dialog.

Covers are similar to chapter starts in that they can force the placement of PDL pages in a job. If the user chooses to have a front cover with no printing, 2 blank pages are inserted at the beginning of the PDL (one for the front of the cover sheet and one for the back). The printing then begins on the front of sheet 2.

Figure 32:
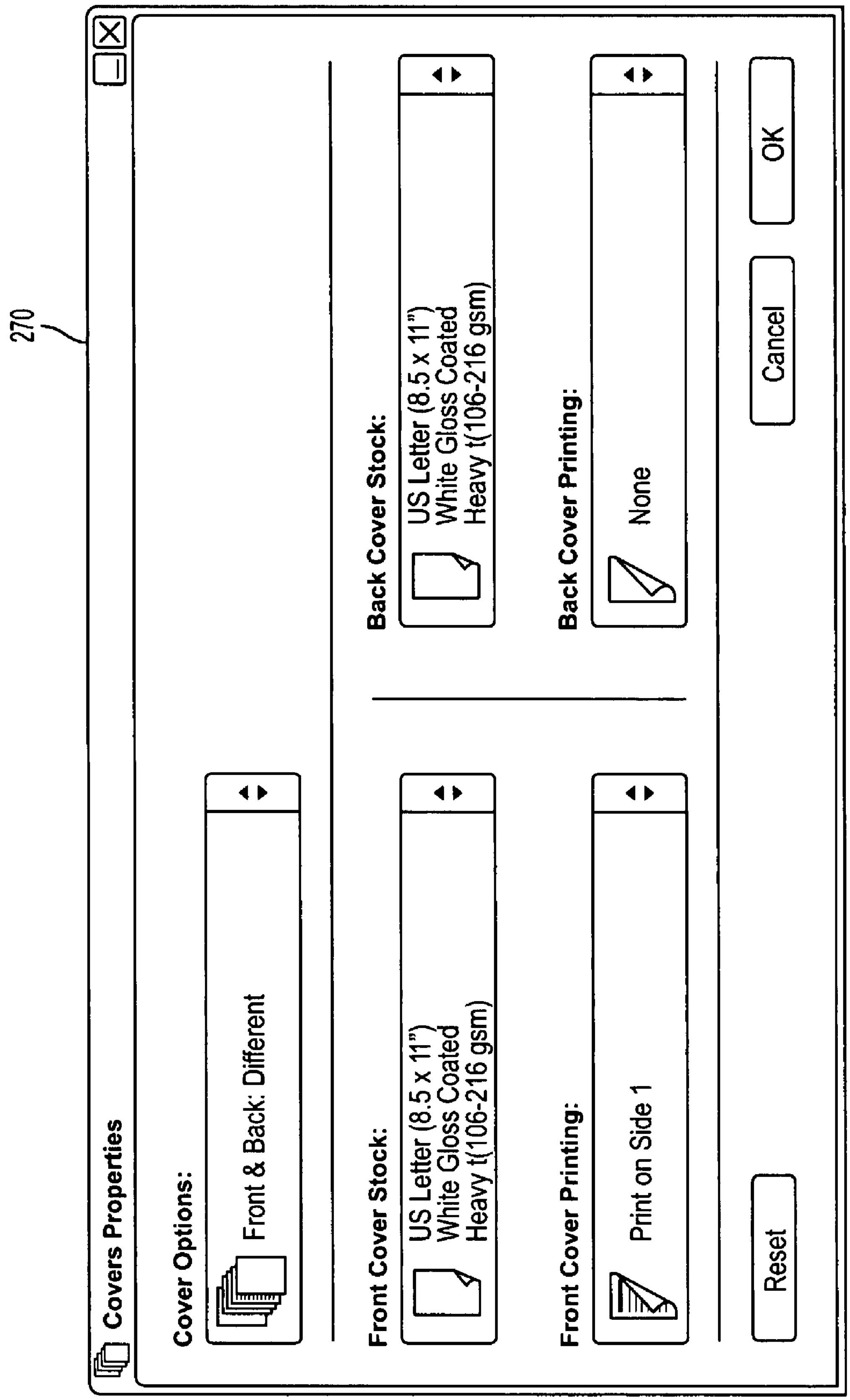
FIG. 32 illustrates a "Covers Properties Window" of an Exception Page Programming System according to an exemplary embodiment of this disclosure.

As illustrated in FIG. 32 and Table 2 below, the user can access the Covers window in the following ways:

Click on the Covers Button in the Button Bar.

Right-mouse on the first or last page of the job, in the View Area. Then select "Covers" from the context menu.

Click on the Multiple Exceptions Icon for a page that is already a Cover and then click on the Covers Icon from the context menu (or simply click the Covers Icon for a single exception).

TABLE 2

Covers Window Feature List

| Feature | Description |
|---|---|
| 1. Cover Options | A drop-down menu that allows the user to turn covers on and off. When Cover Options is set to "None", the rest of the features within the window are disabled. When Cover Options is set to "Front Only", the features associated with the back cover are disabled. When it is set to "Back Only", the features associated with the front cover are disabled. When Cover Options is set to "Front & Back Same", the label on the left hand stock drop down changes to "Front & Back Cover Stock", and the drop-down controls both covers. The right hand (Back Cover) stock drop down becomes disabled, as does the Back Cover printing drop down. When Cover Options is set to "Front & Back Different", both the Front Cover Stock and the Back Cover Stock drop-downs are enabled, as are the Front Cover Printing and Back Cover Printing drop-downs. The user can set them independently. |
| 2. Front Cover Stock, Back Cover Stock, Front & Back Cover Stock | Drop-down menus that allow users to select the paper stock to be used for the front, back, or front and back covers. These drop downs function exactly the same way as the Stock Selection feature in the main dialog (see Job Setup & Submission strategy for details). |
| 3. Front Cover Printing, Back Cover Printing | Drop-down menus that allow the user to specify whether to print on the cover or not. If the user wants to print on the cover, they must specify whether to print on the front, back, or both front and back of the cover. |

Notably, if the Cover Options feature is set to "Front & Back: Same", the Front Cover Stock and Front Cover Printing controls remain active. The Back Cover Stock and Back Cover Printing controls become read-only and update as the front cover controls are manipulated.

Figure 33:
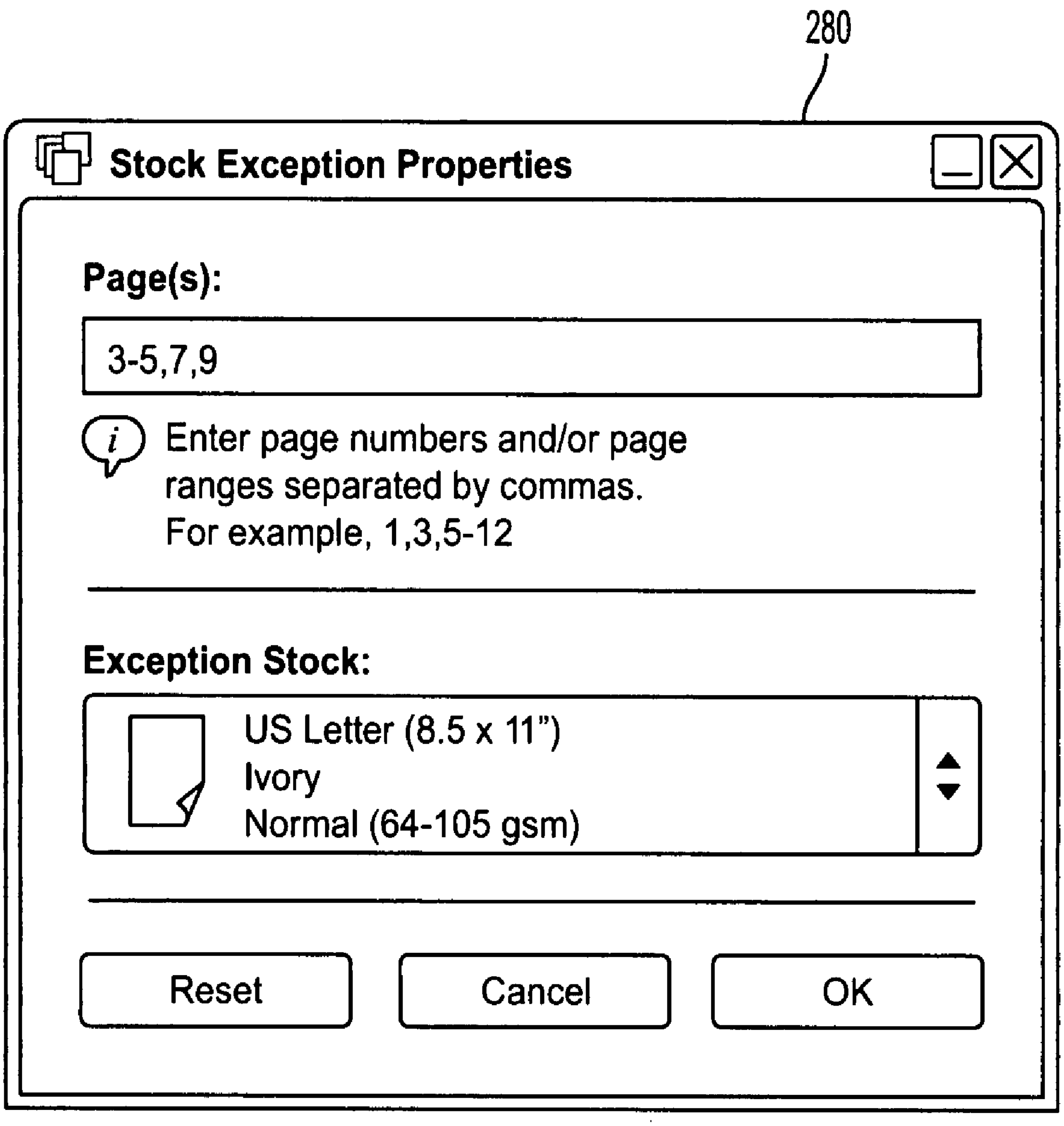
FIG. 33 illustrates a "Stock Exceptions Properties Window" of an Exception Page Programming System according to an exemplary embodiment of this disclosure.

As illustrated in FIG. 33 and Table 3 below, the Stock Exceptions window allows the user to specify stock attributes for the pages, or ranges of pages within a job. The user can access the Stock Exceptions window in the following ways:

Click on the Stock Exception Button in the Button Bar.

Right-mouse on a selected page or range of pages in the View Area. Then select "Stock Exception" from the context menu.

Click on the Multiple Exceptions Icon for a page that is already a Stock Exception and click on the Stock Exception Icon (or simply click the Stock Exception Icon for a single exception).

TABLE 3

Stock Exceptions Feature List

| Feature | Description |
|---|---|
| 1. Exception Page Range | A text entry field that allows the user to specify the pages/sheets that need to be treated as stock exceptions. If a page or range of pages is selected in the View Area when the user opens the Stock Exceptions window, the selected page numbers populate the Exception Page range field. The user can enter a page number, a range of page numbers, or a combination of individual page numbers and page ranges. Pages ranges are indicated with the following syntax [first page of range]-[last page of range] (e.g. 5-12). Pages and page ranges must be separated by commas (e.g. 1, 3, 5-12). |

TABLE 3-continued

| Stock Exceptions Feature List | |
|---|---|
| Feature | Description |
| 2. Exception Stock | Drop-down menu that allows users to select the paper stock to be used for the specified exception pages. The drop down functions exactly the same way as the Stock Selection feature in the main dialog works (see Job Setup & Submission strategy for details). |

Figure 34:
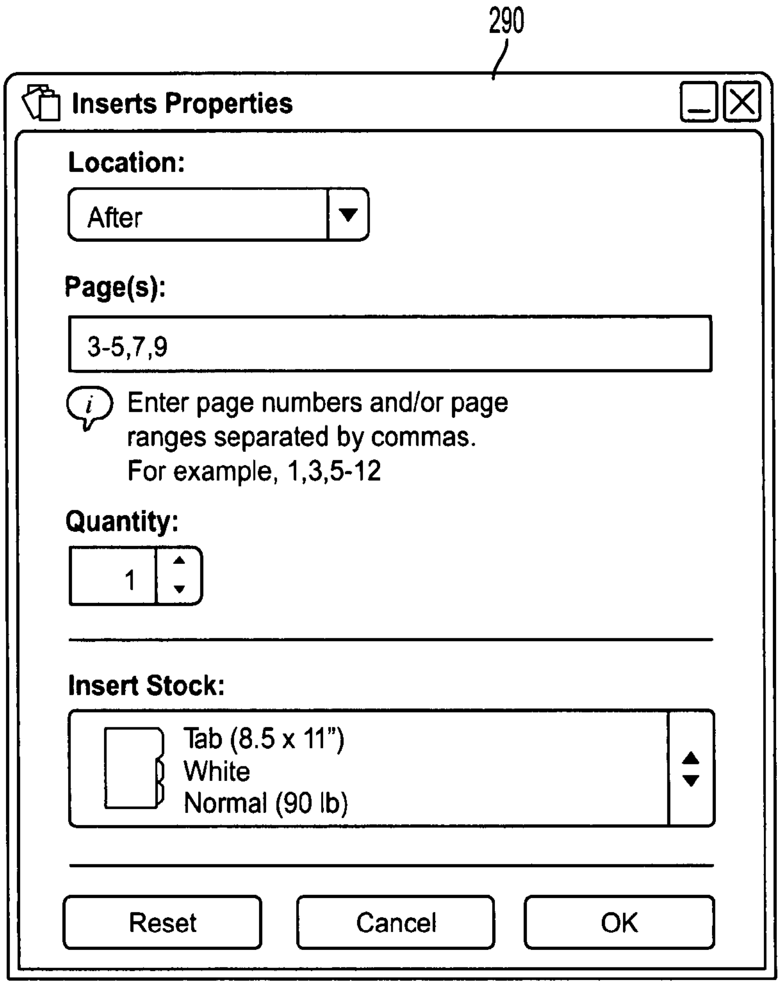
FIG. 34 illustrates an "Inserts Properties Window" of an Exception Page Programming System according to an exemplary embodiment of this disclosure.

As illustrated in FIG. 34 and Table 4 below, the Inserts window 290 allows the user to specify the quantity, location and number of inserts to place within a job. This design does not differentiate between pre-fuser inserts and post-fuser inserts.

The user can access the Inserts window in the following ways:

Click on the Page Inserts Button in the Button Bar.

Click the cursor before or after any sheet in the View Area and then right-mouse. Select "Add Page Insert" from the context menu.

Click on the Multiple Exceptions Icon for a page that is already a Page Insert and click on the Page Insert Icon (or click the Page Insert Icon for a single exception).

Notably, selecting a range of pages puts the specified quantity of inserts before (or after) each page in the range. It simply pulls the required number of sheets from a tray and places them in the specified location. It does not comprehend the modulus of ordered stock within a tray.

TABLE 4

| Inserts Feature List | |
|---|---|
| Feature | Description |
| 1. Location | A drop-down menu that allows the user to specify whether Inserts are to be added before the indicated pages (those listed in the Insert Page Range field), or after them. |
| 2. Insert Page Range | A text entry field menu that allows the user to specify the pages/sheets that are to be Inserted.<br>If the cursor is inserted within View Area when the user opens the Inserts window, the cursor location populates the Insert Page Range field.<br>The user can enter a page number, a range of page numbers, or a combination of individual page numbers and page ranges.<br>Page ranges are indicated with the following syntax [first page of range]-[last page of range] (e.g. 5-12). Pages and page ranges must be separated by commas (e.g. 1, 3, 5-12) |
| 3. Insert Quality | Spin box that allows the user to type in, or spin to the desired quantity of inserts. |
| 4. Insert Stock | Drop-down menu that allows users to select the paper stock to be used for the insert. This drop down menu functions exactly the same way as the Stock Selection feature in the main dialog works (see Job Setup & Submission strategy for details). |

Figure 35:
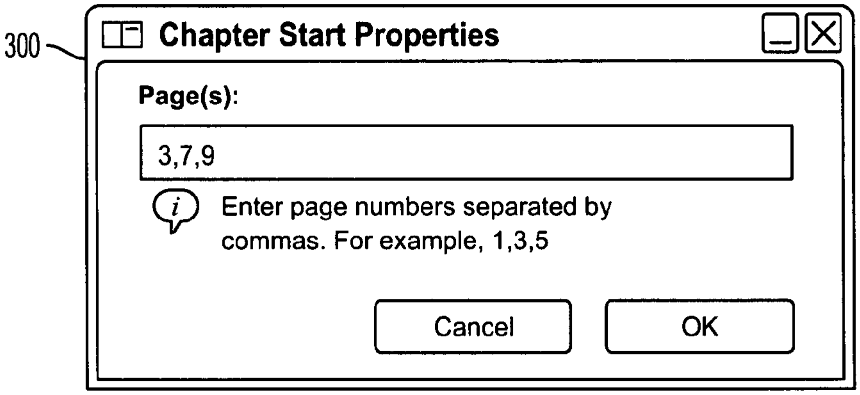
FIG. 35 illustrates a "Chapter Start Properties Window" of an Exception Page Programming System according to an exemplary embodiment of this disclosure.

As illustrated in FIG. 35 and Table 5 below, a Chapter Start Window 300 allows the user to specify pages as chapter starts. Designating a page as a chapter start assures that it will always fall on an odd page (or the right hand side of a spread) within a book. If that does not happen naturally, the Chapter Start feature inserts a blank page to force the chapter start onto an odd page.

The user can access the Chapter Starts window in the following ways:

Click on the Chapter Start Button in the Button Bar.

Click the cursor on any page in the View Area and then right-mouse. Then select "Chapter Start" from the context menu.

Click on the Multiple Exceptions Icon for a page that is already a chapter start and click on the Chapter Start Icon.

TABLE 5

| Chapter Start Feature List | |
|---|---|
| Feature | Description |
| 1. Chapter Start Page(s) | A text entry field that allows the user to specify the pages that are chapter starts.<br>If a page or set of pages is selected when the user opens the Chapter Start window, the selected page numbers populate the Chapter Start Page(s) field.<br>The user can enter individual page numbers for chapter starts. Multiple pages are separated by commas (e.g. 1, 3, 5). |

Figure 36:
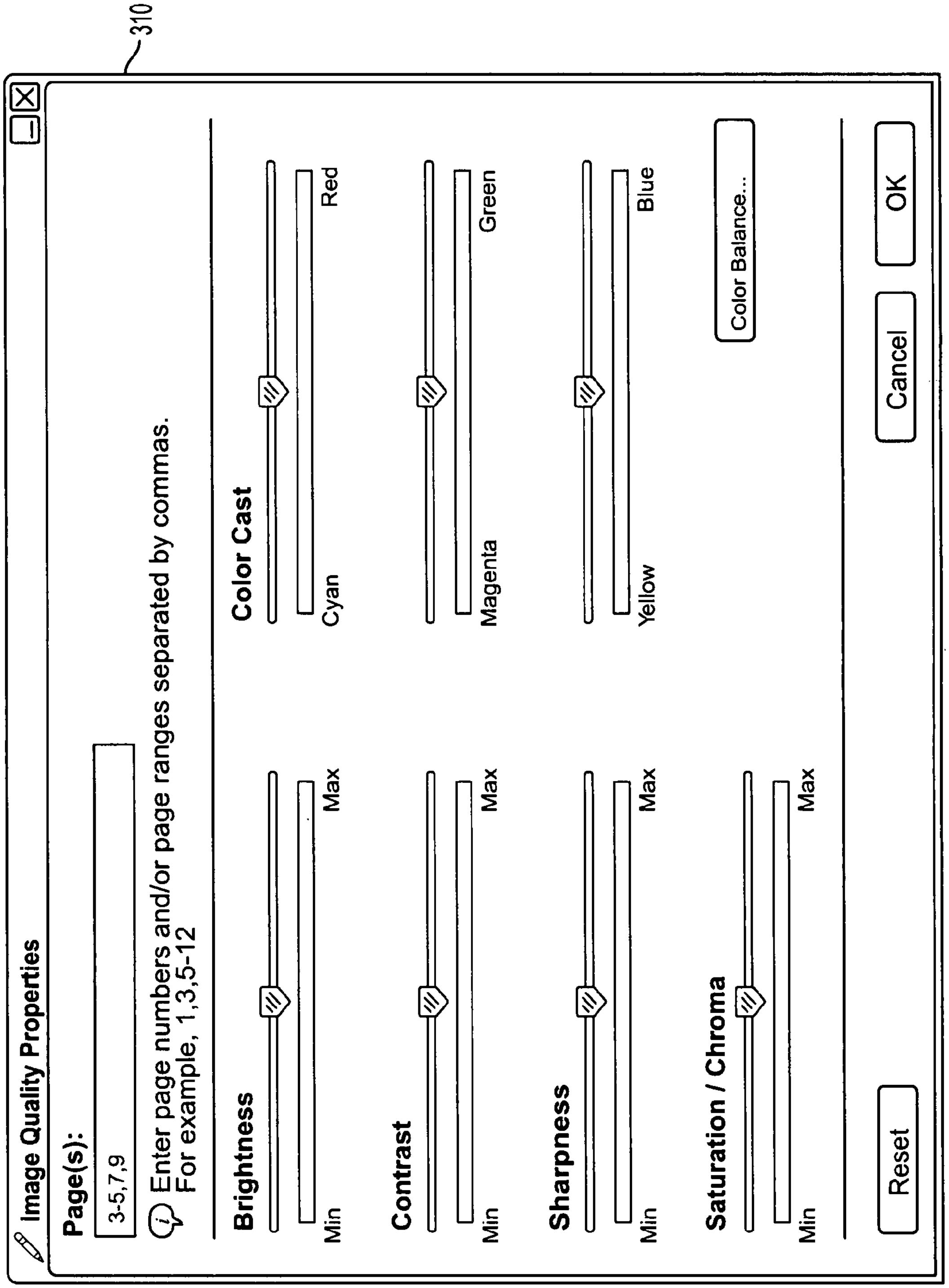
FIG. 36 illustrates an "Image Quality Properties Window" of an Exception Page Programming System according to an exemplary embodiment of this disclosure.

As illustrated in FIG. 36 and Table 6 below, an Image Quality Window 310 allows the user to specify image quality at a page level. Not all Image Quality features that appear in the main dialog are supported within the Exception Pages dialog. The features that are supported mirror the job level image quality features that appear in the main dialog.

The user can access the Image

Quality Exceptions window in the following ways:

Click on the Image Quality Button in the Button Bar.

Click the cursor on any page in the View Area and then right-mouse. Then select "Image Quality" from the context menu.

Click on the Multiple Exceptions Icon for a page that already has image quality exceptions and click on the Image Quality Icon (or click on the Image Quality Icon for a single exception).

TABLE 6

| Image Quality Feature List | |
|---|---|
| Feature | Description |
| 1. Exception Page Range | A text entry field that allows the user to specify the pages that are to have image quality exceptions applied to them. If a page, or set of pages is selected when the user opens the Image Quality Exceptions window, the selected page numbers populate the Exception Page Range field. The user can enter a page number, a range of page numbers, or a combination of individual page numbers and page ranges. Pages ranges are indicated with the following syntax [first page of range]-[last page of range] (e.g. 5-12). Pages and page ranges must be separated by commas (e.g. 1, 3, 5-12). |
| 2. Image Quality Features | The set of supported image quality exception features populate the window. These are determined by what is selected in the "Target Destination" drop-down in the main interface. See the Job Setup & Submission strategy document for details. |

Figure 37:
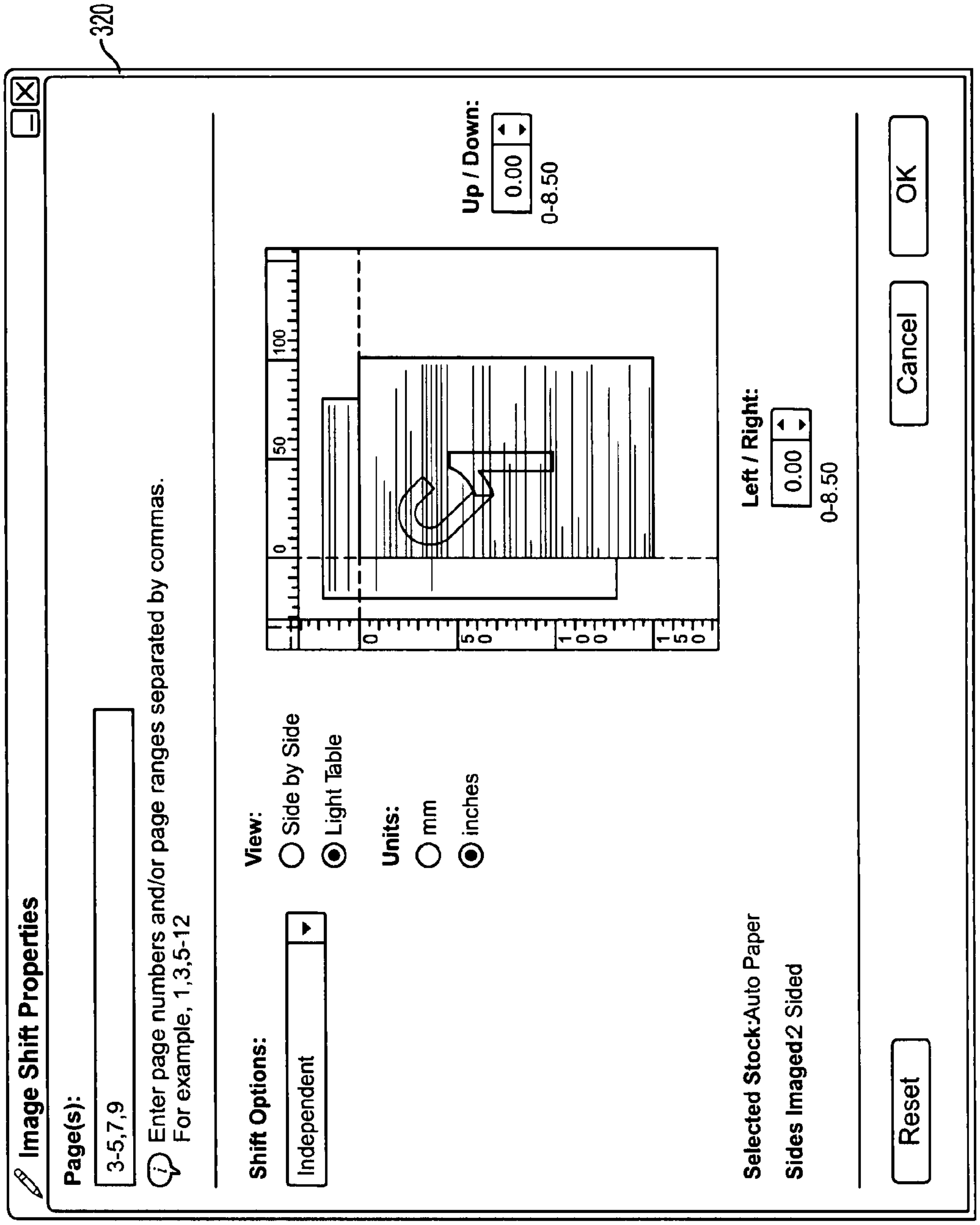
FIG. 37 illustrates an "Image Shift Properties Window" of an Exception Page Programming System according to an exemplary embodiment of this disclosure.

As illustrated in FIG. 37 and Table 7 below, an image shift window 320 allows the user to specify image shifting at a page level. The features that are supported mirror the job level image shift features that appear in the main dialog.

The user can access the Image Shift Exceptions window in the following ways:

Click on the Image Shift Button in the Button Bar.

Click the cursor on any page in the View Area and then right-mouse. Then select "Image Shift" from the context menu.

Click on the Multiple Exceptions Icon for a page that already has image quality exceptions and click on the Image Shift Icon (or click on the Image Shift Icon for a single exception).

TABLE 7

| Image Quality Feature List | |
|---|---|
| Feature | Description |
| 1. Exception Page Range | A text entry field that allows the user to specify the pages that are to have image shift exceptions applied to them. If a page, or set of pages is selected when the user opens the Image Shift Exceptions window, the selected page numbers populate the Exception Page Range field. The user can enter a page number, a range of page numbers, or a combination of individual page numbers and page ranges. Pages ranges are indicated with the following syntax [first page of range]-[last page of range] (e.g. 5-12). Pages and page ranges must be separated by commas (e.g. 1, 3, 5-12). |
| 2. Image Shift Features | The set of supported image shift exception features populate the window. These are determined by what is selected in the "Target Destination" drop-down in the main interface. See the Job Setup & Submission strategy document for details. |

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A printing job exception page handling method comprising:

associating each page of a print job with a page object and a sheet object, wherein the page object and sheet object are linked as separate objects;

displaying visual cues of one or more pages of the print job, wherein the visual cues display one of a thumbnail and icon view of each page of the print job with the respective page object and the respective sheet object;

selectively associate one or more attributes with a user selected page object from the visual cue wherein the exception page handling method modifies the linked sheet object attributes consistent with the page object attributes; and selectively associate one or more attributes with a user selected sheet object from the visual cue, wherein the exception page handling method modifies one or more linked page objects consistent with the sheet object attributes;

wherein the visual cue includes a graphical representation of the print job, the graphical representation simultaneously including the user selected page object, the modified sheet object, the user selected sheet object, the linked page object and a plurality of other print pages not user selected and not linked to a modified user selected object, and the graphical representation includes a sheet view of the print job displaying a series of individual sheets of paper horizontally aligned sequentially as sheet 1 Front, sheet 1 Back, sheet 2 Front, sheet 2 Back.

2. The printing job exception page handling method according to claim 1, wherein the exception page handling method displays an Exception Only View, the Exception Only View displaying a list of exception pages associated with the print job and the respective attributes associated with the exception pages.

3. The printing job exception page handling method according to claim 2, the method comprising:

one or more user selectable print job page modifiers, wherein the user selectable print job page modifiers modify attributes associated with the page object and sheet object associated with the print job page.

4. The printing job exception page handling method according to claim 3, the one or more user selectable print job page modifiers comprising one or more of the following:

(1) a cover stock modifier for the front and back cover;
(2) a stock exceptions modifier for specific pages within the print job;
(3) an inserts modifier for specifying one or more of the quantity, location and number of inserts with the print job;
(4) a chapter start modifier for specifying particular pages of the print job as chapter starts;
(5) an image quality modifier for specifying image quality for a selected page of the print job;
(6) an image shift modifier for shifting an image associated with a selected page of the print job;
(7) a reset page modifier to restore attributes associated with a selected page of the print job to default settings; and
(8) a reset all modifier to restore attributes associated with all pages of the print job to default settings.

5. The printing job exception page handling method according to claim 4, wherein the one or more user selectable print job page modifiers are displayed as icons within a button bar and are selected with a mouse click.

6. The printing job exception page handling method according to claim 1, wherein the exception page handling method displays a Full List View, the Full List View displaying a list of all pages associated with the print job and the respective attributes associated with the print job pages.

7. The printing job exception page handling method according to claim 6, the method comprising:

one or more user selectable print job page modifiers, wherein the user selectable print job page modifiers modify attributes associated with the page object and sheet object associated with the print job page.

8. The printing job exception page handling method according to claim 7, the one or more user selectable print job page modifiers comprising one or more of the following:

(1) a cover stock modifier for the front and back cover;
(2) a stock exceptions modifier for specific pages within the print job;
(3) an inserts modifier for specifying one or more of the quantity, location and number of inserts with the print job;
(4) a chapter start modifier for specifying particular pages of the print job as chapter starts;
(5) an image quality modifier for specifying image quality for a selected page of the print job;
(6) an image shift modifier for shifting an image associated with a selected page of the print job;
(7) a reset page modifier to restore attributes associated with a selected page of the print job to default settings; and
(8) a reset all modifier to restore attributes associated with all pages of the print job to default settings.

9. The printing job exception page handling method according to claim 8, wherein the one or more user selectable print job modifiers are displayed as icons within a button bar and are selected with a mouse click.

10. The printing job exception page handling method according to claim 1, wherein the exception page handling method displays an Icon View, the Icon View displaying icons representing pages associated with the print job.

11. The printing job exception page handling method according to claim 10, the method comprising:

one or more user selectable print job page modifiers, wherein the user selectable print job page modifiers modify attributes associated with the page object and sheet object associated with the print job page.

12. The printing job exception page handling method according to claim 11, the one or more user selectable print jobs page modifiers comprising one or more of the following:

(1) a cover stock modifier for the front and back cover;
(2) a stock exceptions modifier for specific pages within the print job;
(3) an inserts modifier for specifying one or more of the quantity, location and number of inserts with the print job;
(4) a chapter start modifier for specifying particular pages of the print job as chapter starts;
(5) an image quality modifier for specifying image quality for a selected page of the print job;
(6) an image shift modifier for shifting an image associated with a selected page of the print job;
(7) a reset page modifier to restore attributes associated with a selected page of the print job to default settings; and
(8) a reset all modifier to restore attributes associated with all pages of the print job to default settings.

13. The printing job exception page handling method according to claim 1, wherein the exception page handling method displays a Thumbnail View, the Thumbnail View displaying Thumbnail representations of the pages associated with the print job.

14. The printing job exception page handling method according to claim 13, the method comprising:

one or more user selectable print job page modifiers, wherein the user selectable print job page modifiers modify attributes associated with the page object and sheet object associated with the print job page.

15. The printing job exception page handling method according to claim 14, the one or more user selectable print job page modifiers comprising one or more of the following:

(1) a cover stock modifier for the front and back cover;
(2) a stock exceptions modifier for specific pages within the print job;
(3) an inserts modifier for specifying one or more of the quantity, location and number of inserts with the print job;
(4) a chapter start modifier for specifying particular pages of the print job as chapter starts;
(5) an image quality modifier for specifying image quality for a selected page of the print job;
(6) an image shift modifier for shifting an image associated with a selected page of the print job;
(7) a reset page modifier to restore attributes associated with a selected page of the print job to default settings; and
(8) a reset all modifier to restore attributes associated with all pages of the print job to default settings.

16. The printing job exception page handling method according to claim 1, wherein the exception page handling method displays one or more of an Exception Only View, a Full List View, an Icon View and a Thumbnail View.

* * * * *